US012332678B2

(12) United States Patent
Liu et al.

(10) Patent No.: US 12,332,678 B2
(45) Date of Patent: Jun. 17, 2025

(54) TRANSMISSION AND DISTRIBUTION COORDINATION FOR DISTRIBUTED ENERGY RESOURCES INTEGRATION TO ELECTRICITY MARKETS

(71) Applicants: Midcontinent Independent System Operator, Inc., Carmel, IN (US); The Trustees of the Stevens Institute of Technology, Hoboken, NJ (US)

(72) Inventors: Yikui Liu, Jersey City, NJ (US); Lei Wu, Princeton, NJ (US); Yonghong Chen, Zionsville, IN (US); Yafei Yang, Shaanxi (CN)

(73) Assignees: MIDCONTINENT INDEPENDENT SYSTEM OPERATOR, INC., Carmel, IN (US); THE TRUSTEES OF THE STEVENS INSTITUTE OF TECHNOLOGY, Hoboken, NJ (US)

( * ) Notice: Subject to any disclaimer, the term of this patent is extended or adjusted under 35 U.S.C. 154(b) by 546 days.

(21) Appl. No.: 17/573,135

(22) Filed: Jan. 11, 2022

(65) Prior Publication Data

US 2022/0229459 A1    Jul. 21, 2022

Related U.S. Application Data

(60) Provisional application No. 63/136,303, filed on Jan. 12, 2021.

(51) Int. Cl.
*G06Q 30/0202* (2023.01)
*G05F 3/04* (2006.01)
(Continued)

(52) U.S. Cl.
CPC ............... *G05F 3/04* (2013.01); *G06F 17/14* (2013.01); *G06Q 30/0202* (2013.01);
(Continued)

(58) Field of Classification Search
CPC ........ G06Q 50/06; G06Q 40/04; G06Q 10/04; G06Q 10/063; G06Q 30/00; H02J 3/008;
(Continued)

(56) References Cited

U.S. PATENT DOCUMENTS

| 7,835,978 B2 * | 11/2010 | Camenisch | ............ G06Q 40/04 705/37 |
| 2003/0220864 A1 * | 11/2003 | Peljto | ............ G06Q 50/06 705/37 |

(Continued)

OTHER PUBLICATIONS

Wang et al., Day-ahead optimal bidding and scheduling strategies for DER aggregator considering responsive uncertainty under real-time pricing, 2020 (Year: 2020).*

(Continued)

*Primary Examiner* — Darrin D Dunn
(74) *Attorney, Agent, or Firm* — BakerHostetler

(57) ABSTRACT

One or more systems and methods according to the present disclosure may apply a model for integrating distribution systems having proliferated distributed energy resources into the independent system operator energy market, particularly when one or more distribution systems are connected to a transmission system via multiple interconnection buses. Additionally, systems and methods for applying a compact multi-port model for power exchanges and associated bidding strategies are described. A the multi-port power exchange model may be constructed based on the operational feasible region of a distribution system; describing physical operation characteristics of distributed energy resources, flexible loads, and the distribution network; and the bidding strategy model may describe total operating cost of the distribution system, while recognizing electrically coupled injections of multiple interconnection buses.

19 Claims, 10 Drawing Sheets

(51) Int. Cl.
  G06F 17/14 (2006.01)
  G06Q 50/06 (2024.01)
  H02J 3/00 (2006.01)
(52) U.S. Cl.
  CPC .............. *G06Q 50/06* (2013.01); *H02J 3/003* (2020.01); *H02J 3/0075* (2020.01); *H02J 2203/10* (2020.01); *H02J 2203/20* (2020.01); *H02J 2310/64* (2020.01)
(58) Field of Classification Search
  CPC .......... H02J 3/14; H02J 3/381; H02J 2203/20; H02J 3/28; G05B 17/02
  See application file for complete search history.

(56) References Cited

U.S. PATENT DOCUMENTS

| | | | |
|---|---|---|---|
| 2003/0229576 A1* | 12/2003 | Peljto | G06Q 40/04 705/37 |
| 2009/0319415 A1* | 12/2009 | Stoilov | G06Q 40/04 705/37 |
| 2016/0077507 A1* | 3/2016 | Sheble | G06Q 10/06 700/295 |
| 2018/0287382 A1* | 10/2018 | Genc | H02J 3/14 |
| 2020/0082422 A1* | 3/2020 | Sun | H02J 3/466 |
| 2022/0284458 A1* | 9/2022 | Sun | G06Q 30/0206 |
| 2022/0285942 A1* | 9/2022 | Koo | H02J 3/28 |

OTHER PUBLICATIONS

On Accurate and Compact Model of High DER-Penetrated Sub-Transmission/Primary Distribution Systems in ISO Energy Market (Year: 2021).*
Vincente-Pastor et al.; "Evaluation of Flexibility Markets for Retailer-DSO-TSO Coordination"; IEEE Transactions on Power Systems; vol. 34; May 2019; p. 2003-2012.
Barkin et al.; "Toward Coordinated Transmission and Distribution Operations"; IEEE Power & Energy Society General Meeting; 2018; 5 pages.
Safdarian et al.; "Optimal Electricity Procurement in Smart Grids With Autonomous Distributed Energy Resources"; IEEE Transactions on Smart Grid; vol. 6(6); 2015; p. 2795-2984.
Saint-Pierre et al.; "Active Distribution System Management: A Dual-Horizon Scheduling Framework for DSO/TSO Interface Under Uncertainty"; IEEE Transactions on Smart Grid; vol. 8 No. 5; Sep. 2017; p. 2186-2197.
Anthony Papavasiliou; "Coordination Schemes for the Integration of Transmission and Distribution System Operations"; Center for Operations Research and Econometrics; Oct. 2017; 28 pages.
Yuan et al.; "Hierarchical coordination of TSO-DSO economic dispatch considering large-scale integration of distributed energy resources"; Applied Energy; vol. 195; 2017; p. 600-615 (abstract only).
Silva et al.; "Estimating the Active and Reactive Power Flexibility Area at the TSO-DSO Interface"; IEEE Transactions on Power Systems; vol. 33; 2018; p. 4741-4750.
Shahidehpour et al.; "Market Operations in Electric Power Systems—Forecasting, Scheduling, and Risk Management"; The Institute of Electrical and Electronics Engineers Inc. New York; John Wiley & Sons Inc.; © 2002; 531 pages.
Wu et al.; "Stochastic SCUC Solution with Variable Wind Energy Using Constrained Ordinal Optimization"; IEEE Transactions on Sustainable Energy; vol. 5 No. Apr. 2, 2014; p. 379-388.
Doe; Quadrennial Energy Review Transforming the Nation's Electricity System: The Second Installment of the QER; Jan. 2017; 512 pages.
Li et al.; "Valuation of distributed energy resources in active distribution networks"; The Electricity Journal; vol. 32; May 2019; p. 27-36 (abstract only).
Hadush et al.; "DSO-TSO cooperation issues and solutions for distribution grid congestion management"; Energy Policy; vol. 120; Sep. 2018; 49 pages.
Verzijlberg et al.; "Renewable Energy Sources and Responsive Demand. Do We Need Congestion Management in the Distribution Grid?"; IEEE Transactions on Power Systems; vol. 29; Sep. 2014; p. 2119-2128 (abstract only).
Birk et al.; "TSO/DSO Coordination in a Context of Distributed Energy Resource Penetration"; MIT Center for Energy and Environmental Policy Research; Working Paper Series; Oct. 2017; 28 pages.
Wu et al.; "Demand Response Exchange in the Stochastic Day-Ahead Scheduling with Variable Renewable Generation"; IEEE Transactions on Sustainable Energy; vol. 6 No. 2; Apr. 2015; p. 516-525.
Bragin et al.; "Toward Coordinated Transmission and Distribution Operations"; IEEE Power & Energy Society General Meeting; Mar. 2018; 5 pages.
Fu et al.; "Different models and properties on LMP calculations"; IEEE Power Engineering Society General Meeting; 2006; 11 pages.
G. Strang; Linear Algebra and Its Application; $4^{th}$ Edition; Brooks/Cole—India Editon; 2005; 491 pages.
J. L. Imbert; "Fourier's Elimination: Which to Choose?"; In Proc. PPCP; Chapter 1; 1993; 26 pages.
Paulraj et al.; "A Comparative Study of Redundant Constraints Identification Methods in Linear Programming Problems"; Mathematical Problems in Engineering; vol. 2010; 2010; 16 pages.
Vielma et al.; "Modeling disjunctive constraints with a logarithmic number of binary variables and constraints"; Mathematical Programming; vol. 128; 2011; 20 pages.
Misener et al.; "Piecewise-Linear Approximations of Multidimensional Functions"; Journal of Optimization Theory and Applications; vol. 145; 2010; 31 pages.
Wu et al.; "Accelerating NCUC Via Binary Variable-Based Locally Ideal Formulation and Dynamic Global Cuts"; IEEE Transactions on Power Systems; vol. 31; Sep. 2016; p. 4097-4107 (abstract only).
Lofberg et al.; "YALMIP: a toolbox for modeling and optimization in MATLAB"; IEEE Int'l Conf. on Robotics and Automation; 2004; 6 pages.
W. Hogan et al.; "Electricity Markets and the Clean Power Plan"; The Electricity Journal; vol. 28; Sep. 2015; 31 pages.
Keane et al.; "Enhanced Utilisation of Voltage Control Resources with Distributed Generation"; IEEE Transactions on Power Systems; vol. 26; May 2011; p. 252-260.
Nyiso; "Distributed Energy Resources Roadmap for New York's Wholesale Electricity Markets"; Jan. 2017; 39 pages.
Daraeepour et al.; "Strategic Demand-Side Response to Wind Power Integration"; IEEE Transactions on Power Systems; vol. 31 No. 5; Sep. 2016; p. 3495-3505.
Yang et al.; "Solving OPF using linear approximations: fundamental analysis and numerical Demonstration"; IET Generation, Transmission & Distribution; vol. 11 No. 17; 2017; p. 4115-4125.
Abiri-Jahromi et al.; "On the Loadability Sets of Power Systems—Part II: Minimal Representations"; IEEE Transactions on Power Systems; vol. 32; 2017; p. 146-156.

* cited by examiner

TRANSMISSION AND DISTRIBUTION COORDINATION FOR DISTRIBUTED ENERGY RESOURCES INTEGRATION TO ELECTRICITY MARKETS

This application claims priority to U.S. Provisional Patent Application Ser. No. 63/136,303, which was filed on Jan. 12, 2021. The entire disclosure of U.S. Provisional Patent Application Ser. No. 63/136,303 is incorporated herein by reference.

BACKGROUND OF THE INVENTION

Distributed energy resources ("DERs") refers to devices that generate, and optionally store, electricity and are often relatively small, grid-connected or distribution-system-connected devices, in contrast to the generation and transmission of electricity from a conventional power station. Compared to a conventional power station, DERs may be relatively smaller, decentralized, modular, relatively more flexible, or closer to the load being served, while generally having relatively smaller capacities. DERs may use renewable energy and may include distributed energy storage systems ("DESSs").

In recent years, the relative amount of electricity generated from DERs has increased, particularly from renewable DERs such as solar and wind generators. DERs connected at a distribution level have reformed power flow patterns, transforming distribution line flows from unidirectional to multidirectional, which can feed energy back to the transmission system. Additionally, a high amount of energy generated from renewable sources is often accompanied by increased loads, likely due to reduced electricity prices in the wholesale market. These factors may each contribute to an increased likelihood of line congestions in distribution systems.

Moreover, high resistance-to-reactance ratios in distribution lines may cause bus voltages to be more sensitive to active power injections from DERs. Deeper penetration of DERs could trigger voltage rise issues.

At present, despite increased promotion of DER integration in independent system operator ("ISO") markets, DERs still may bid only on interconnection buses of distribution systems to the transmission system. In many ISO markets, primary distribution systems are simplified as fixed loads with forecasted values or flexible loads with aggregated bids. DERs located in the distribution systems may be considered merely as behind-the-meter load modifiers. As such, dispatch instructions to DERs from the ISO market clearing may result, neglecting bus voltage and line flow limits of distribution networks and potentially causing voltage violations, line flow congestions, or forced curtailment of renewable energy. In short, conventional, simplified models used by ISOs may be oversimplified, deriving dispatch instructions potentially resulting in (or increasing the risk of) line congestion and renewable DER curtailments. DER curtailments may result in a failure to maximize economic features of DERs in distribution systems.

Recent increases in the prevalence of DERs have been accompanied by a shift in many distribution system operators ("DSOs") from a passive role to an active role in operating the distribution system reliably, while economically managing all connected assets.

Typically, ISOs do not collect configuration details such as DER parameters, network data, or flexible loads, such as installed capacities and interconnection statuses, to model primary distribution systems exhaustively. It may be more challenging for owners of DERs and flexible loads to regularly update dynamic information, such as offer prices and available generations of DERs, with ISOs. More effective coordination between ISOs and DSOs, particularly DSOs with high DER penetration, is desired, and increased data sharing with more timely communication is also desired.

But even in such a scenario, ISOs might still be reluctant to model distribution systems exhaustively, which would likely require a complex AC power flow model to capture internal operation constraints of distribution systems, including voltage limits and line flow limits. It is not a trivial task to exhaustively model a large number of DERs and flexible loads and the detailed distribution system topology into conventional ISO energy market clearing tools. Specifically, dispatch variables of all DERs and flexible loads would have to appear in individual transmission line flow constraints, which would pose significant computational challenges to ISO energy market clearing tools and deteriorate market-clearing efficiency Accordingly, systems or methods of modeling distribution systems compactly while also accurately capturing the relationship between ISO-DSO active power exchange in the ISO market and active power outputs of DERs to capture their economic features effectively, while fully respecting internal operation constraints of distribution systems, are desired. Also desired are systems or methods of modeling distribution systems compactly which can accurately simulate their physical and economic impacts to the transmission system while respecting their internal operation constraints, such as line flow limits and dispatch ranges of DERs and flexible loads. In this way, individual DERs could be effectively managed by the DSO locally, while indirectly interacting with the ISO energy market through the compact model. Moreover, with awarded power from the ISO energy market, the DSO could self-schedule all assets within its service territory to achieve economic benefits.

Several approaches have been proposed to facilitate the coordination of transmission and distribution systems having high DER penetration. In one example, Birk et al., "TSO/DSO coordination in a context of distributed energy resource penetration," October 2017, available at http://ceepr.mit.edu/files/papers/2017-017.pdf, reviewed current practices in ISO-DSO coordination with proliferated DERs and indicated that preliminary coordination may be achievable through tailored market mechanisms and specific market rules. Vicente-Pastor et al, "Evaluation of flexibility markets for Retailer-DSO-TSO coordination," *IEEE Trans. Power Syst.*, vol. 34, no. 3, pp. 2003-2012, May 2019, also looked at more complex market designs.

In academia, bilevel models represent a mainstream approach to ISO-DSO coordination. For example, Barkin and Dvorkin, "Toward coordinated transmission and distribution operations," *IEEE Power & Energy Society General Meeting* (PESGM), Portland, OR, USA, August 2018, proposed a bilevel ISO-DSO coordination framework in which the ISO clears the energy market in the upper level and DSOs optimize consumptions in the lower level with respect to ISO energy market clearing prices. In turn, this may impact the ISO market clearing results. This approach may allow economic and physical characteristics of the distribution network to be modeled. In one example, Safdarian et al., "Optimal electricity procurement in smart grids with autonomous distributed energy resources," *IEEE Trans. on Smart Grid*, vol. 6, no. 6, pp. 2795-2984, November 2015, discussed an electricity procurement model for DSOs to coordinate heterogeneous DERs for minimizing the total distribution system operation cost or pursuing financial targets of individual DERs. Saint-Pierre and Mancarella, "Active distribution system management: a dual-horizon scheduling framework for DSO/TSO interface under uncertainty," *IEEE Trans. on Smart Grid*, vol. 8, no. 5, pp. 2186-2197, September 2017, proposed to manage DERs and other assets coordinately with a two-phase model.

While in bilevel models the ISO need not configuration details of distribution systems, bilevel models are often solved via an iterative procedure, which would be difficult for ISOs to adopt due to concerns over coordination ability, policies, and operation platform upgrades.

Papavasiliou and Mezghani, "Coordination schemes for the integration of transmission and distribution system operations," *Power Systems Computation Conference (PSCC)*, Dublin, Ireland, June 2018, and Yuan and Hesamzadeh, "Hierarchical coordination of TSO-DSO economic dispatch considering large-scale integration of distributed energy resources," *Appl. Energy*, vol. 195, no. 2, pp. 600-615, June 2017, offered a practically applicable approach to approximate distribution systems in an ISO energy market via univariate linear functions, associating net power injections of distribution systems with operating costs. And Silva et al., "Estimating the active and reactive power flexibility area at the TSO-DSO interface," *IEEE Trans. Power Syst.*, vol. 33, no. 5, pp. 4741-4750, September 2018, further depicted the feasible region of net power injections while considering internal operation constraints of distribution systems. Yet these approaches assume that primary distribution systems are connected to the transmission system through a single interconnection bus in which power exchange between distribution and transmission systems depends solely on net load of the distribution system. In reality, primary distribution systems, especially those in urban areas, could connect to the transmission system via multiple interconnection buses for enhancing power supply reliability. In such a case, power injections at multiple interconnection buses are electrically coupled, depending on line impedances and generation dispatches both inside and outside the distribution system. In such an example, these approaches to ISO-DSO coordination models would be invalid.

BRIEF SUMMARY OF THE DISCLOSURE

Accordingly, a need exists for systems and methods applying a novel model for integrating distribution systems having proliferated DERs into the ISO energy market, particularly when one or more distribution systems are connected to a transmission system via multiple interconnection buses.

Aspects of the present disclosure may aim to solve the foregoing or related needs. One or more aspects of the present disclosure stand from the perspective of ISOs and look to practically apply models to existing ISO energy market platforms. Aspects of the present disclosure look to capture impacts of distribution systems in the transmission system, while respecting economic features of DERs and internal physical limits of distribution systems.

Aspects of the present disclosure depart from existing practice of simplifying distribution systems as either fixed loads or flexible loads, as such simplification tends to not fully respect internal operation constraints of distribution systems. Another aspect of the present disclosure may require little to no iterative interaction between the ISO and DSOs and may present improved computational performance compared to exhaustively modeling the full distribution systems.

One aspect of the present disclosure may present novel ISO day-ahead energy market models and formulations of the operation feasible region of distribution systems. Another aspect of the present disclosure may provide for application or integration of distribution systems into the ISO energy market. While the present disclosure may be particularly relevant for distribution systems connected to the transmission system via multiple interconnection buses, advantages may still be seen when each distribution system is connected to the transmission system via a single interconnection bus.

In another aspect of the present disclosure, systems and methods applying a compact multi-port model for power exchanges and associated bidding strategies are described. Embodiments of such an aspect may pay special attention to primal distribution systems connected to the transmission network via multiple interconnection buses, such as those in urban areas for enhancing reliability. A compact multi-port model for power exchanges and associated bidding strategies may simultaneously simulate the physical and economic features of distribution system operations. Specifically, the multi-port power exchange model may be constructed based on the operational feasible region of a distribution system, describing physical operation characteristics of DERs, flexible loads, and the distribution network; and the bidding strategy model may describe total operating cost of the distribution system while recognizing electrically coupled injections of multiple interconnection buses. Embodiments may yield both computational advantages and high accuracy, where results on awarded power and operation cost of distribution systems as well as line flows of transmission and distribution networks align with those when the full distribution system is explicitly modelled in the ISO energy market model.

BRIEF DESCRIPTION OF THE DRAWINGS

The foregoing and other features of the present disclosure will become more fully apparent from the following description and appended potential points of novelty, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE DISCLOSURE

Figure 1:
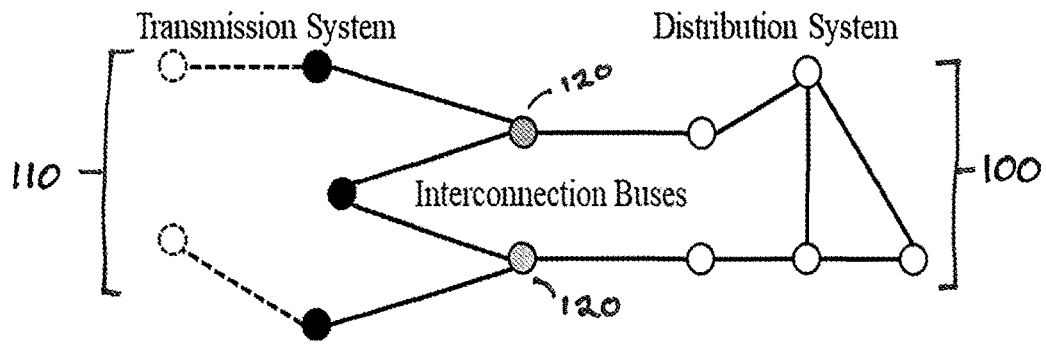
FIG. 1 shows an illustrative example of a distribution system connected to the transmission system with two interconnection buses according to an embodiment of the first aspect of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and potential points of novelty are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to systems and methods applying one or more novel models for integrating distribution systems having proliferated DERs into the ISO energy market, regardless of whether one or more distribution systems are connected to a transmission system via one or multiple interconnection buses.

First Aspect of the Present Disclosure

In one aspect of the present disclosure, a model may include a step of formulating the operation feasible region of a distribution system. In an embodiment, the formulating step may consider bus voltage and line flow limits. A model may further include a step of categorizing variables of the feasible region into desired variables and undesired variables. A model may additionally include a step of applying a feasible region projection approach to eliminate undesired variables while preserving desired variables. A model may further include a step of including the desired variables and any associated constraints in an ISO energy market model to capture impacts of distribution systems in the transmission system, while respecting economic features of DERs and internal physical limits of distribution systems.

As an overview, certain variables and symbols may be used herein as follows. All distribution systems may be collected in set $\mathcal{D}$ and indexed by d; $\mathcal{D}_i$ may denote the set of distribution systems, each of which may contain bus i as one of interconnection buses to the transmission system; buses in the transmission system and distribution system d may be respectively collected in sets $\mathcal{J}^T$ and $\mathcal{J}_d^D$, indexed by i, i', and i"; $\mathcal{J}_d^B$ may denote the set of duplicated interconnection buses in distribution system d, and the counterpart of an interconnection bus $i \in \mathcal{J}_d^B$ in the transmission system is referred to as $i' \in \mathcal{J}_{i,d}^T$; lines in the transmission system and distribution system d may be respectively collected in sets $\mathcal{L}^T$ and $\mathcal{L}_d^D$, indexed by ii' indicating the direction is from bus i to bus i'; $\mathcal{G}^T$ and $\mathcal{G}_d^D$ respectively may denote sets of units and DERs in the transmission system and distribution system d, indexed by g; $\mathcal{F}^T$ and $\mathcal{F}_d^D$, respectively may denote sets of fixed loads in the transmission system/distribution system d; $\mathcal{G}_i^T \mathcal{F}_i^T$ and $\mathcal{G}_{i,d}^D \mathcal{F}_{i,d}^D$ may denote sub-sets of corresponding assets connected at bus i in the transmission system and distribution system d; the set of time intervals in the entire scheduling horizon may be denoted by $\mathcal{T}$, indexed by t and t'; the last time interval may be denoted as T.

FIG. 1 provides an example diagram showing a looped distribution system 100 connected to the transmission system 110 through multiple (in the case of FIG. 1, two) interconnection buses 120. Of note, the term distribution systems as used herein may refer to looped or radial distribution systems, unless specified or dictated by context.

Figure 2:
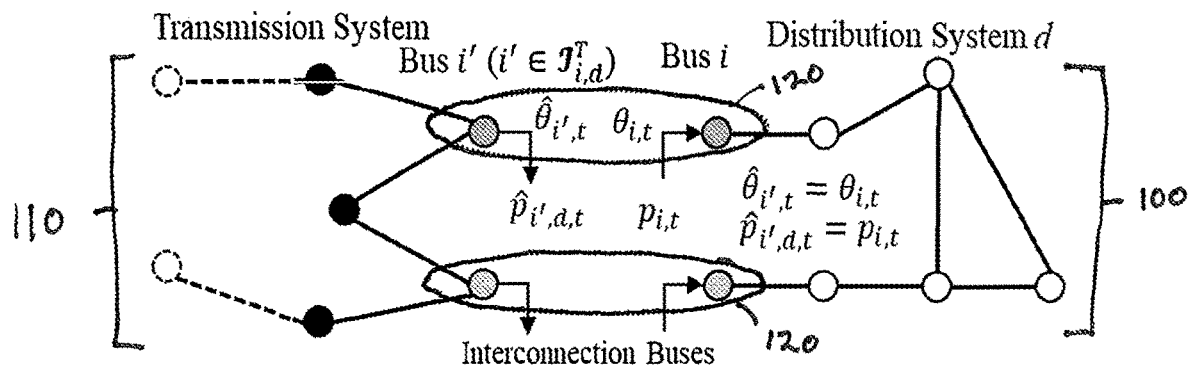
FIG. 2 shows an illustration of variable duplication according to an embodiment of the first aspect of the present disclosure.

FIG. 2 provides an example diagram, showing the diagram of FIG. 1 with the variables of the interconnection buses 120 duplicated to formulate distribution systems 100 and transmission systems 110 separately.

This disclosure presents a model, which may be referred to as an ISO day-ahead energy market model. One embodiment of such an ISO day-ahead energy market model may be shown as in formulations (1)-(11), which follow. Systems and methods applying such a model may allow for practical improvements in integrating distributions with DERs into the ISO energy market. The embodiment of an ISO day-ahead energy market model as shown in formulations (1)-(11) considers only thermal units and includes constraints on line flow limits at the system level and minimum ON/OFF time limits, dispatch ranges, and ramping limits at the unit level. Such a model may be extended to consider alternative or additional system assets, including flexible loads and virtual bids, as well as constraints such as reserve limits. The caret symbol (^) may be used to indicate variables and parameters for the transmission system, distinguishing them from those for the distribution systems. One objective of the ISO energy market is to minimize system operating cost.

The embodiment of the ISO day-ahead energy market model shown in formulations (1)-(11) may be described as follows. Formulation (1) is directed to minimizing system operating cost, where $\hat{C}_g$, $\widehat{CL}_g$, and $\widehat{SU}_g$ represent energy bidding prices, no-load cost, and startup cost of unit g, respectively; binary variables $\hat{I}_{g,t}$ and $\hat{Y}_{g,t}$ indicate ON/OFF status and startup of unit g at time t; $\hat{p}_{g,t}$ denotes active power dispatch of unit g at time t. The DC power flow model is formulated as in (2)-(3) via the voltage phase angle form, assuming unity voltage magnitudes for all buses and ignoring reactive power flows. Active power flow $\hat{p}_{ii',t}$ along line ii' at time t is calculated as in (2), where variable $\hat{\theta}_{i,t}$ denotes voltage phase angle of bus i at time t and $\hat{X}_{ii'}$ is reactance of line ii'. Nodal active power balance is enforced by (3), where $\hat{P}_{f,t}$ represents active power demand of fixed load f at time t and variable $\hat{p}_{i,d,t}$ is net active power withdraw of distribution system d from its interconnection bus i at time t. $\hat{\theta}_{i,t}$ and $\hat{p}_{i,d,t}$ are illustrated in FIG. 2. Dispatch ranges of units are limited by their active power lower and upper bounds $\hat{P}_g^{LB}$ and $\hat{P}_g^{UB}$ as in (4). Constraints (5)-(6) are the classic "3-bin" form startup/shutdown constraints. Unit minimum ON and OFF time limit is enforced by (7)-(8), where $\widehat{UT}_g$ are $\widehat{DT}_g$ is minimum ON and OFF time of unit g. Constraints (9)-(10) represent unit ramp-up and ramp-down limits, while also recognizing distinct ramping limits during startup and shutdown procedures. $\hat{R}_g^{RU}$ and $\hat{R}_g^{RU}$ are ramp-up and down rates of unit g during operation procedure, and $\hat{R}_g^{SU}$ and $\hat{R}_g^{SD}$ are those during startup and shutdown procedures. Constraint (11) assigns the reference bus, indexed as bus ref.

One embodiment of the ISO day-ahead energy market model shown in formulations (1)-(11) is described as follows:

$$\min \Sigma_{t\in \mathcal{T}} \Sigma_{g\in \mathcal{G}^T} (\hat{C}_g \cdot \hat{p}_{g,t} + \widehat{CL}_g \cdot \hat{I}_{g,t} + \widehat{SU}_g \cdot \hat{Y}_{g,t}) \quad (1)$$

$$\hat{p}\_(i-i'',t) = ((\hat{\theta}(i,t) - \hat{\theta}(i'',t)))/\hat{X}(i-i''); \; i-i'' \in \mathcal{L}^T, t\in T \quad (2)$$

$$\Sigma_{ii'\in \mathcal{L}_i^T} \hat{p}_{ii',t} + \Sigma_{d\in \mathcal{D}_i} \hat{p}_{i,d,t} + \Sigma_{f\in \mathcal{F}_i^T} \hat{P}_{f,t} = \Sigma_{i'i\in \mathcal{L}^T} \hat{p}_{i'i,t} + \Sigma_{g\in \mathcal{G}_i^T} \hat{p}_{g,t}; \; i\in \mathcal{J}^T, t\in \mathcal{T} \quad (3)$$

$$\hat{P}_g^{LB} \cdot \hat{I}_{g,t} \leq \hat{p}_{g,t} \leq \hat{P}_g^{UB} \cdot \hat{I}_{g,t}; \; g\in \mathcal{G}^T, t\in \mathcal{T} \quad (4)$$

$$\hat{Y}_{g,t} - \hat{Z}_{g,t} = \hat{I}_{g,t} - \hat{I}_{g,t-1}; \; g\in \mathcal{G}^T, t\in \mathcal{T} \quad (5)$$

$$\hat{Y}_{g,t} + \hat{Z}_{g,t} \leq 1; g\in \mathcal{G}^T, t\in \mathcal{T} \quad (6)$$

$$\Sigma_{t'=t-\widehat{UT}_g+1}^{t} \hat{Y}_{g,t'} \leq \hat{I}_{g,t}; \; g\in \mathcal{G}^T, t\in \mathcal{T} \quad (7)$$

$$\Sigma_{t'=t-\widehat{DT}_g+1}^{t} \hat{Z}_{g,t'} \leq 1 - \hat{I}_{g,t}; \; g\in \mathcal{G}^T, t\in \mathcal{T} \quad (8)$$

$$\hat{p}_{g,t} - \hat{p}_{g,t-1} \leq \hat{R}_g^{RU} \cdot \hat{I}_{g,t-1} + \hat{R}_g^{SU} \cdot \hat{Y}_{g,t}; \; g\in \mathcal{G}^T, t\in \mathcal{T} \quad (9)$$

$$\hat{p}_{g,t} - \hat{p}_{g,t-1} \leq \hat{R}_g^{RD} \cdot \hat{I}_{g,t-1} + \hat{R}_g^{SD} \cdot \hat{Z}_{g,t}; \; g\in \mathcal{G}^T, t\in \mathcal{T} \quad (10)$$

$$\theta_{ref,t} = 0 \; t\in \mathcal{T} \quad (11)$$

It may be desirable for an ISO to adopt a linear model to ensure computational efficiency, and so it may be further desirable to formulate the operation feasible region of distribution systems via linear models. Accordingly, an approximated linear power flow model for distribution systems may be adopted, which may provide advantages in (a) the inclusion of reactive power flow and voltage magnitudes, (b) not needing an initial operation point, and (c) having a relatively high approximation accuracy.

An operation feasible region of a distribution system d, in an embodiment, may be formulated according to formulations (12)-(24), which may be described as follows. Active power flow $p_{ii',t}$ and reactive power flow $q_{ii',t}$ along line ii' may be calculated as in (12)-(13). Nodal active and reactive power balance for internal and interconnection buses may be respectively constrained by (14)-(15) and (16)-(17). Variable $v_{i,t}$ may denote voltage magnitude of bus i at time t; $G_{ii'}$ and $B_{ii'}$ may represent conductance and susceptance of line ii'; $q_{g,t}$ may denote reactive power dispatch of unit g at time t; $Q_{f,t}$ may represent reactive power demand of fixed load f at time t. Constraint (18) may fix voltage magnitudes of the interconnection buses as 1 p.u., consistent with the DC power flow-based transmission system model. Constraints (19) and (20) may restrict line flows and bus voltages, where $P_{ii'}^{UB}$ may be an active power limit of line ii' and $V_i^{LB}/V_i^{UB}$ may be a lower/upper voltage limit of bus i. Net active and reactive power injections from the transmission system may be constrained as in (21) and (22) with bounds $P_i^{UB}$ and $Q_i^{UB}$. When $p_{i,t}/q_{i,t}$ is negative, distribution system d may provide active/reactive power support to the transmission system. Dispatch ranges of DERs may be limited by their active and reactive power bounds $P_g^{LB}/P_g^{UB}$ and $Q_g^{LB}/Q_g^{UB}$ as in (23) and (24). $\mathcal{P}_d$ may be used to denote the operation feasible region (12)-(24) of distribution system d.

An operation feasible region of a distribution system shown in (12)-(24) may be represented as follows:

$$p_{ii',t} = G_{ii'}(v_{i,t} - v_{i,t}) - B_{ii'}(\theta_{i,t} - \theta_{i',t}); \; ii'\in \mathcal{L}_d^D, t\in \mathcal{T} \quad (12)$$

$$q_{ii',t} = -B_{ii'}(v_{i,t} - v_{i',t}) - G_{ii'}(\theta_{i,t} - \theta_{i',t}); \; ii'\in \mathcal{L}_d^D, t\in \mathcal{T} \quad (13)$$

$$\Sigma_{ii'\in \mathcal{L}_d^D} p_{ii',t} + \Sigma_{f\in \mathcal{F}_{i,d}^D} P_{f,t} = \Sigma_{i'i\in \mathcal{L}_d^D} p_{i'i,t} + \Sigma_{g\in \mathcal{G}_{i,d}^D} p_{g,t}; \; i\in \mathcal{J}_d^P/\mathcal{J}_d^B, t\in \mathcal{T} \quad (14)$$

$$\Sigma_{ii'\in \mathcal{L}_d^D} q_{ii',t} + \Sigma_{f\in \mathcal{F}_{i,d}^D} Q_{f,t} = \Sigma_{i'i\in \mathcal{L}_d^D} q_{i'i,t} + \Sigma_{g\in \mathcal{G}_{i,d}^D} q_{g,t}; \; i\in \mathcal{J}_d^P/\mathcal{J}_d^B, t\in \mathcal{T} \quad (15)$$

$$\Sigma_{ii'\in \mathcal{L}_d^D} p_{ii',t} = p_{i,t}; \; i\in \mathcal{J}_d^B, t\in \mathcal{T} \quad (16)$$

$$\Sigma_{ii'\in \mathcal{L}_d^D} q_{ii',t} = q_{i,t}; \; i\in \mathcal{J}_d^B, t\in \mathcal{T} \quad (17)$$

$$v_{i,t} = 1; \; i\in \mathcal{J}_d^B, t\in \mathcal{T} \quad (18)$$

$$-P_{ii'}^{UB} \leq p_{ii',t} \leq P_{ii'}^{UB}; \; ii'\in \mathcal{L}_d^D, t\in \mathcal{T} \quad (19)$$

$$V_i^{LB} \leq v_{i,t} \leq V_i^{UB}; \; i\in \mathcal{J}_d^P/\mathcal{J}_d^B, t\in \mathcal{T} \quad (20)$$

$$-P_i^{UB} \leq p_{i,t} \leq P_i^{UB}; \; i\in \mathcal{J}_d^B, t\in \mathcal{T} \quad (21)$$

$$-Q_i^{UB} \leq q_{i,t} \leq Q_i^{UB}; \; i\in \mathcal{J}_d^B, t\in \mathcal{T} \quad (22)$$

$$P_g^{LB} \leq p_{g,t} \leq P_g^{UB}; \; g\in \mathcal{G}_d^D, t\in \mathcal{T} \quad (23)$$

$$Q_g^{LB} \leq q_{g,t} \leq Q_g^{UB}; \; g\in \mathcal{G}_d^D, t\in \mathcal{T} \quad (24)$$

In another aspect of the present disclosure, systems and methods for integrating the operation feasible region of distribution systems into the ISO energy market may be described.

The operation feasible region $\mathcal{P}_d$ of distribution system d may be classified into two sets, desired variables $\mathcal{V}_d^D$ and undesired variables $\mathcal{V}_d^U$, such that $\mathcal{V}_d^D = \{\theta_{i,t} (i\in \mathcal{J}_d^B), p_{i,t}, p_{g,t}\}$ and $\mathcal{V}_d^U = \{\theta_{i,t} (i\in \mathcal{J}_d^P/\mathcal{J}_d^B), v_{i,t}, q_{i,t}, q_{g,t}, p_{ii',t}, q_{ii',t}\}$. In an embodiment, desired variables refer to the variables included in the ISO energy market clearing model. The operation feasible region of distribution system d (12)-(24) can be represented in a compact form (25), where $A_d^D$ and $A_d^U$ are coefficient matrices of $\mathcal{V}_d^D$ and $\mathcal{V}_d^U$, and $B_d$ is a vector of constant terms. It is worthwhile to mention that equality constraints are not explicitly shown in (25), which can be equivalently represented as two inequality constraints.

Compact-form formulation (25) may be represented as follows:

$$A_d^D \cdot \mathcal{V}_d^D + A_d^U \cdot \mathcal{V}_d^U \leq B_d \quad (25)$$

The operation feasible region represented in (25) may be projected onto the space of $\mathcal{V}_d^P$ as in (26). That is, if $\mathcal{V}_d^P$ is a feasible solution to (26), there must exist $\mathcal{V}_d^U$ such that $\mathcal{V}_d^P$ and $\mathcal{V}_d^U$ together is a feasible solution to (25). In (26), $C_d^P$ and $D_d$ are coefficient matrix and constant vector generated via the feasible region projection.

The feasible region projection may be represented as follows:

$$C_d^P \cdot \mathcal{V}_d^P \leq D_d \quad (26)$$

Feasible region projection may realized with Gaussian elimination and Fourier-Motzkin elimination via two steps: (i) variables $p_{ii',t}$ and $q_{ii',t}$ may be eliminated immediately by substituting equality constraints (12)-(13) in (14)-(17). After that, equality constraints (14)-(18) may be used to further eliminate $\theta_{i,t}$ (i∈$\mathcal{I}_d^D$/$\mathcal{I}_d^B$), $v_{i,t}$, and $q_{i,t}$ i.e., equality constraints may be reformatted in a row echelon form by Gaussian elimination to substitute these variables in inequality constraints; (ii) Fourier-Motzkin elimination may further process remaining undesired variables $q_{g,t}$ in inequality constraints. While the theoretical exponential complexity of the Fourier-Motzkin elimination algorithm may typically be computationally unworkable or at least impractical, an aspect of the present disclosure involves adopting Imbert's acceleration theorems to mitigate exponential growth of inequality constraints by filtering out redundancy generated in each iteration, which may accelerate the algorithm and improve its likelihood of practical implementation. Other filtering mechanisms may also or alternatively be employed or embedded, such as a mixed-integer linear programming based iterative algorithm or a linear programming ("LP") method to mitigate redundancy, for example in each iteration of the Fourier-Motzkin elimination.

Figure 3:
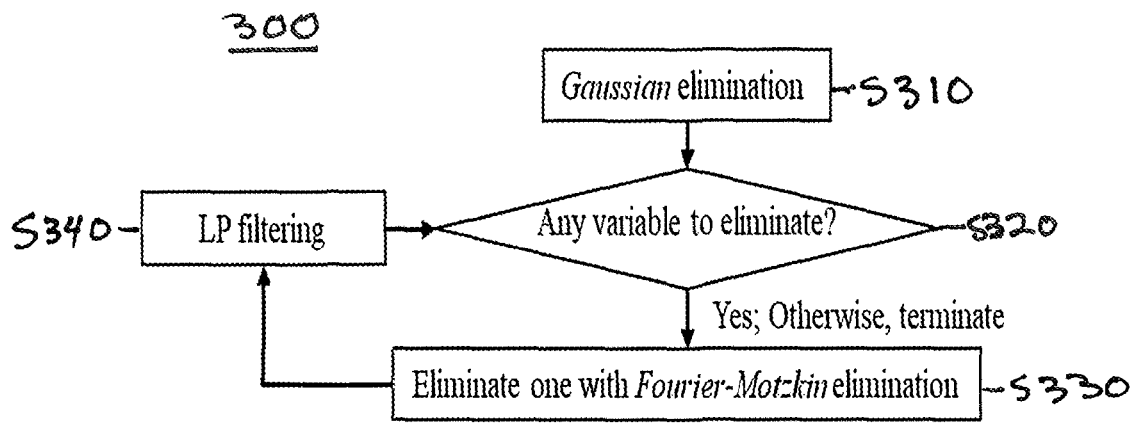
FIG. 3 shows a flowchart of the feasible region projection method according to an embodiment of the first aspect of the present disclosure.

FIG. 3 provides an example flowchart outlining one embodiment of the feasible region projection process 300. Step S310 may involve executing Gaussian elimination. Feasible region projection process may proceed to step S320, which may query whether there are any variables to eliminate. If the answer to the query of step S320 is anything other than yes, the feasible region projection process may terminate. If the answer to the query of step S320 is yes, the feasible region projection process 300 may proceed to step S330, which eliminates a variable identified in step S320 through Fourier-Motzkin elimination. The feasible region projection process 300 may then proceed to step S340, which applies LP filtering. After step S340, the feasible region projection process 300 returns to step 320, where the feasible region projection process 300 continues as described.

The embodiments of the feasible region projection of $\mathcal{P}_d$ described herein present no time-coupling constraints in the feasible region (12)-(24), so projections of $\mathcal{P}_d$ for individual time periods may be conducted in parallel. Moreover, because Gaussian elimination and Fourier-Motzkin elimination process only constraints containing undesired variables, constraints (21) and (23) may remain unchanged throughout the feasible region projection process.

Another aspect of the present disclosure may involve using a feasible region projection method to construct a feasible region $\tilde{\mathcal{P}}_d$ for desired variables $\mathcal{V}_d^P$ out of the original feasible region $\mathcal{P}_d$, guaranteeing that for any feasible solution $\mathcal{V}_d^P \in \tilde{\mathcal{P}}_d$, there exists a solution to $\mathcal{V}_d^U$, together with $\mathcal{V}_d^P$, is feasible to $\mathcal{P}_d$, i.e., ($\mathcal{V}_d^U$, $\mathcal{V}_d^P$)∈ $\mathcal{P}_d$. Additionally, the projected feasible region $\tilde{\mathcal{P}}_d$ for desired variables $\mathcal{V}_d^P$ can be represented as in (27), where and $A_{h,i,t}^\theta$, $A_{h,i,t}^P$, and $A_{h,g,t}^G$ are generated coefficients to desired variables $\theta_{i,t}$ (i∈$\mathcal{I}_d^B$), $p_{i,t}$, and $p_{g,t}$; $B_{h,t}$ is the generated constant term; $\mathcal{H}_{d,t}$, indexed by h, collects all the generated constraints at time t.

$$\sum_{i \in \mathcal{I}_d^B} A_{h,i,t}^\theta \cdot \theta_{i,t} + \sum_{i \in \mathcal{I}_d^B} A_{h,i,t}^P \cdot p_{i,t} +$$
$$\sum_{g \in \mathcal{G}_d^D} A_{h,g,t}^G \cdot p_{g,t} \leq B_{h,t}; \; h \in \mathcal{H}_{d,t}, t \in \mathcal{T} \quad (27)$$

In practice, a DSO may prepare the projected feasible region $\tilde{\mathcal{P}}_d$ of distribution system d submit it to the ISO, together with bids of DERs. Desired variables may serve as an interface to describe the interaction of distribution system d with the transmission system. Specifically, variables $\theta_{i,t}$ (i∈$\mathcal{I}_d^B$) and $p_{i,t}$ may be forced to be equal to their counterparts $\hat{\theta}_{i',t}$ and $\hat{p}_{i',d,t}$ (i'∈$\mathcal{I}_{i,d}^T$) defined at the transmission side, such as in (28)-(29), as illustrated in FIG. 2. In addition, energy production costs of DERs may be added into the objective as in (30). Moreover, the ISO may include the projected feasible region $\tilde{\mathcal{P}}_d$ (27) into the energy market model (1)-(11) to represent physical operation limits of distribution system d.

(28)-(30) may be represented as follows:

$$\hat{p}_{i',d,t} = p_{i,t}; \; i' \in \mathcal{I}_{i,d}^T, i \in \mathcal{I}_d^B, t \in \mathcal{T} \quad (28)$$

$$\theta_{i',t} = \theta_{i,t}; \; i' \in \mathcal{I}_{i,d}^T, i \in \mathcal{I}_d^B, t \in \mathcal{T} \quad (29)$$

$$\min \sum_{t \in \mathcal{T}} \sum_{g \in \mathcal{G}^T} (\hat{C}_g \cdot \hat{p}_{g,t} + \widehat{CL}_g \cdot \hat{I}_{g,t} + \widehat{SU}_g \cdot \hat{Y}_{g,t}) +$$
$$\sum_{t \in \mathcal{T}} \sum_{d \in \mathcal{D}} \sum_{g \in \mathcal{G}_d^D} C_g \cdot p_{g,t} \quad (30)$$

After the ISO energy market is cleared, solutions to desired variables may be sent back to the DSOs, who, utilizing the solutions to desired variables, may recover a set of feasible solutions to undesired variables according to the original constraints (12)-(24).

In other aspect of the present disclosure, systems and methods may apply models of unit commitment decisions of DERs. In an embodiment, unit commitment decisions of DERs may be modeled by replacing constraints (23)-(24) by (31)-(32), where binary variable $I_{g,t}$ indicates the ON/OFF status of DER g at time t. (31)-(32) may be represented as follows:

$$P_g^{LB} \cdot I_{g,t} \leq p_{g,t} \leq P_g^{UB} \cdot I_{g,t}; \; g \in \mathcal{G}_d^D, t \in \mathcal{T} \quad (31)$$

$$Q_g^{LB} \cdot I_{g,t} \leq q_{g,t} \leq Q_g^{UB} \cdot I_{g,t}; \; g \in \mathcal{G}_d^D, t \in \mathcal{T} \quad (32)$$

In this case, $I_{g,t}$ may also be considered a desired variable in the feasible region projection, as $I_{g,t}$ may be involved in the objective function (33) to count for DERs' no-load and startup costs. This also may extend (27) to (34), where $A_{h,g,t}^I$ is generated coefficients to $I_{g,t}$. Startup status indicators $Y_{g,t}$ of DERs can be linked with $I_{g,t}$ via the classic "3-bin" form startup/shutdown constraints similar to (5)-(6). Moreover, other constraints related to ON/OFF status of DERs, such as minimum ON/OFF time constraint (7)-(8), can also be formulated via $I_{g,t}$. (33) and (34) may be represented as follows:

$$\min \sum_{t \in \mathcal{T}} \sum_{g \in \mathcal{G}^T} (\hat{C}_g \cdot \hat{p}_{g,t} + \widehat{CL}_g \cdot \hat{I}_{g,t} + \widehat{SU}_g \cdot \hat{Y}_{g,t}) +$$
$$\sum_{t \in \mathcal{T}} \sum_{d \in \mathcal{D}} \sum_{g \in \mathcal{G}_d^D} (C_g \cdot p_{g,t} + CL_g \cdot I_{g,t} + SU_g \cdot Y_{g,t}) \quad (33)$$

$$\sum_{i \in \mathcal{I}_d^B} A_{h,i,t}^\theta \cdot \theta_{i,t} + \sum_{i \in \mathcal{I}_d^B} A_{h,i,t}^P \cdot p_{i,t} + \sum_{g \in \mathcal{G}_d^D} A_{h,g,t}^I \cdot I_{g,t} +$$
$$\sum_{g \in \mathcal{G}_d^D} A_{h,g,t}^G \cdot p_{g,t} \leq B_{h,t}; \; h \in \mathcal{H}_{d,t}, t \in \mathcal{T} \quad (34)$$

In another aspect of the present disclosure, further steps may be taken to reduce the computational complexity of the Fourier-Motzkin elimination. In an embodiment, distinct characteristics of distribution systems may be leveraged to mitigate computational complexity. As an example, as violations could happen merely on a limited number of lines and buses in distribution systems, not all assets need to be monitored. Therefore, constraints (19)-(20) can be applied on selective lines and buses, which could further reduce computational burden of the feasible region projection. Additionally, the feasible region projection may be conducted by DSOs offline before the ISO market clearing execution. Therefore, constructing the projected feasible region is not a time-restricted task for the DSOs.

In an embodiment, one or both of the Gaussian elimination and Fourier-Motzkin elimination steps may involve multiple multiplication and division operations. Implementing them with floating point arithmetic may introduce numerical errors, whose accumulation could further result in numerical issues. Accordingly, coefficients in (12)-(24) may be represented as fraction numbers so that floating point arithmetic can be replaced by integer arithmetic to mitigate numerical issues. Importantly, digital lengths of numerators and denominators may be effectively controlled, to ensure calculation accuracy while avoiding trivial calculations of fractions with digital length explosion. As an example, the decimal 0.3333332 may be reasonably represented as 1/3 instead of 55555/499996, with negligible accuracy loss. In an embodiment, such fraction number operations may be implemented as Fraction in Python. Alternatively, in an embodiment, such fraction number operations may be implemented as Sym in MATLAB.

Formulating the feasible region (12)-(24) of a distribution system may require the detailed network configuration data, including network topology and parameters of lines and DERs, while also introducing a complicated power flow model with voltage and reactive power flow variables. Through the feasible region projection to convert constraints (12)-(24) into (27), voltage and reactive power flow variables may be eliminated, and active power variables of DERs may be kept to describe the interaction between distribution and transmission systems, which is the focus of the ISO. Constraint (27) may be compatible to the ISO energy market model (1)-(11), and may be easily implemented with limited efforts. From (12)-(24) to (27), moreover, the original coefficients in (12)-(24) may be masked by the generated coefficients in (27) that conceal physical meanings, which may resolve potential data privacy barriers between the ISO and DSOs.

Advantageously, a distribution system integration model such as is described herein may require no iterative interaction between the transmission system and distribution systems during the market clearing procedure, consistent with current ISO market-clearing practices.

Additionally, the model described herein may present higher computational performance than the full transmission-distribution model by directly integrating the full distribution system model (12)-(24) into the ISO energy market.

In another aspect according to the present disclosure, systems and methods may apply an integration model where each distribution system is connected to the transmission system by a single interconnection bus.

When each distribution system 100 is connected to the transmission system 110 by multiple interconnection buses 120, from the perspective of the distribution side, the transmission system 110 is presented as multiple recourses with net power injections $p_{i,t}$ at individual interconnection buses. Critically, $p_{i,t}$ ($i \in \mathcal{I}_d^B$) are electrically coupled. That is, the summation of $p_{i,t}$ is equal to the net load of the distribution system 100, while values of individual $p_{i,t}$ are determined by physical features of both the transmission and distribution sides. Indeed, this coupling is enforced by constraint (29), requiring $\theta_{i,t}$ equal to ($i' \in \mathcal{I}_{i,d}^T$) on individual interconnection buses 120.

Figure 4:
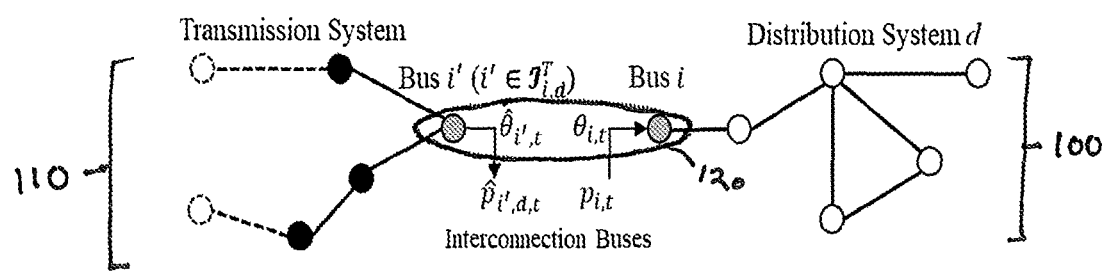
FIG. 4 shows an illustrative example of a distribution system with a single interconnection bus according to an embodiment of the first aspect of the present disclosure.

When each distribution system 100 is connected to the transmission system 110 by only a single interconnection bus 120, such as illustrated by FIG. 4, only one $p_{i,t}$ exists which can be solely determined by the net load of the distribution side. Thus, constraint (29) can be dropped and in turn $\theta_{i,t}$ ($i \in \mathcal{I}_d^P / \mathcal{I}_d^B$) is no longer needed to explicitly simulate the coupling between the distribution system 100 and the transmission system 110. To this end, $\theta_{i,t}$ ($i \in \mathcal{I}_d^P / \mathcal{I}_d^B$) can be further classified as undesired variables, and variables in the feasible region $\mathcal{P}_d$ can be categorized into $\mathcal{V}_d^D$ and $\mathcal{v}_d^U$ as $\mathcal{v}_d^D = \{p_{i,t}, p_{g,t}\}$ and $\mathcal{v}_d^U = \{\theta_{i,t}, v_{i,t}, q_{i,t}, p_{ii',t}, q_{ii',t}\}$. All voltage phase angle variables $\theta_{i,t}$ are undesired and will be eliminated. Thereby, the projected feasible region can be represented as in (35), in which $\theta_{i,t}$ is absent as compared with (27). (35) may be represented as follows:

$$\Sigma_{i \in \mathcal{I}_d^g} A_{h,i,t}^P \cdot p_{i,t} + \Sigma_{g \in \mathcal{G}_d^D} A_{h,g,t}^G \cdot p_{g,t} \leq B_{h,t}, h \in \mathcal{H}_{d,t}, t \in \mathcal{T} \quad (35)$$

Advantageously, by leveraging the fact that $\theta_{i,t}$ are not needed to represent the coupling between transmission and distribution systems with a single interconnection bus, the following two strategies are studied to facilitate the feasible region projection process:

(i) For a distribution system, its interconnection bus is set as the internal reference bus, i.e., voltage phase angle variable $\theta_{i,t}$ for $i \in \mathcal{I}_d^B$ is set as 0 to directly eliminate $\theta_{i,t}$.

(ii) After Gaussian elimination, the remaining variables in the inequality constraints are $p_{i,t}$, $p_{g,t}$, and $q_{g,t}$. Leveraging the feature that boundaries of $p_{i,t}$, $p_{g,t}$, and $q_{g,t}$ are known in advance, a boundary filtering strategy may be employed to identify inactive constraints with limited computational efforts. That is, for a constraint in the standard "≤" form, its maximum possible value can be calculated by substituting the variable associated with a positive/negative coefficient via its upper/lower bound. If strictly less than is still hold with the maximum possible value, this constraint is redundant and can be dropped.

Figure 5:
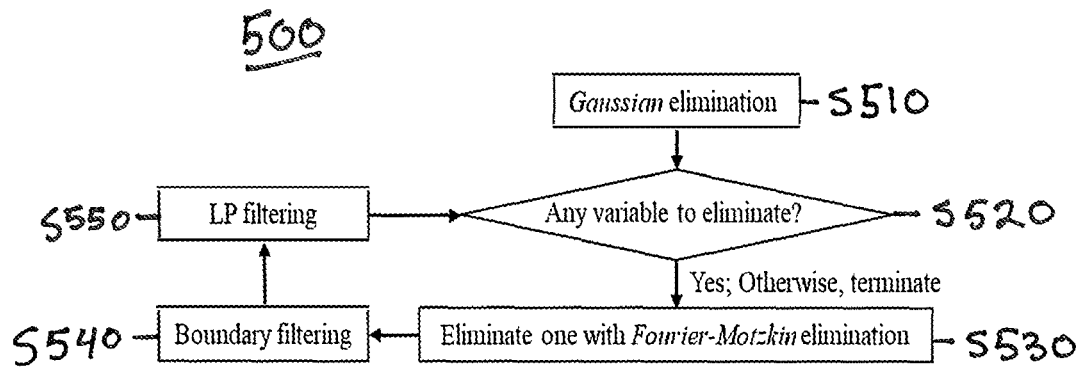
FIG. 5 shows a flowchart of the feasible image region projection with boundary filtering according to an embodiment of the first aspect of the present disclosure.

FIG. 5 presents an example flowchart of the feasible region projection that included an embedded boundary filtering strategy. As shown in FIG. 5, feasible region projection process 500 may substantially begin with step S510 that may include executing Gaussian elimination. The feasible region projection process 500 may proceed to step S520, which may query whether there are any variables to eliminate. If the answer to the query of step S520 is anything other than yes, the feasible region projection process 500 may terminate. If the answer to the query of step S520 is yes, the feasible region projection process 500 may proceed to step S530, which may eliminate a variable through Fourier-Motzkin elimination. The feasible region projection process 500 may then proceed to step S540, which applies boundary filtering. After boundary filtering in step S540, the feasible region projection process 500 may proceed to step S550, which applies LP filtering. After the LP filtering in step S550, the feasible region projection process 500 returns to step 520, where the feasible region projection process 500 continues as described.

In this embodiment, the three filtering strategies may be executed sequentially on individually generated constraints. In this way, advantageously, the LP filtering process, which may typically be the most computationally intensive of the filtering processes, is applied only on the few constraints that pass through the first two filtering strategies.

After the ISO market is cleared, with solutions to desired variables released by the ISO, a DSO can recover a set of feasible solutions to undesired variables via constraints (12)-(24). However, the recovered voltage phase angles $\theta_{i,t}$ $\forall i \in \mathcal{J}_d^D$ in the distribution system are with reference to its own interconnection bus, instead of the reference bus ref of the transmission system. This can be easily fixed by adding the value of $\hat{\theta}_{i',t}$ (i'$\in \mathcal{J}_{i,d}^T$), i.e., the voltage phase angle solution of the interconnection bus from the transmission side, to individual $\theta_{i,t}$ for $\forall i \in \mathcal{J}_d^P$. After that, all voltage phase angle solutions are referred to the global reference bus ref of the transmission system, and constraint (29) is naturally met.

In an aspect of the present disclosure, the ISO energy market clearing model may be described where each distribution system is interconnected with the transmission system by a single bus.

When each primary distribution system is connected to the transmission system via a single interconnection bus, constraint (29) may no longer be needed. That is, bus voltage angles $\hat{\theta}_{i,t}$ may not be needed from the perspective of formulating the coupling of transmission and distribution systems. To this end, the shift factor form, the common practice of ISOs, can be adopted to build the DC power flow model in the ISO energy market. That is, constraints (2)-(3) can be replaced with (36)-(37), and constraint (11) can be removed. Constraint (36) is the system power balance, and (37) calculates line flow with shift factors $\overline{SF}_{ii',i''}$. Indeed, adopting shift factors can reduce the numbers of variables and constraints (i.e., avoid variables $\hat{\theta}_{i,t}$ as well as nodal power balance constraints), which could dramatically reduce the computational burden. Constraints (36) and (37) may be represented as follows:

$$\Sigma_{g \in \mathcal{G}^T} \hat{p}_{g,t} = \Sigma_{d \in \mathcal{D}} \Sigma_{i \in \mathcal{J}_d^B} \hat{p}_{i,d,t} + \Sigma_{f \in \mathcal{F}^T} \hat{P}_{f,t} ; t \in T \quad (36)$$

$$\hat{p}_{ii',t} = \Sigma_{i'' \in \mathcal{J}^T} \overline{SF}_{ii',i''} (\Sigma_{g \in \mathcal{G}_{i''}^T} \hat{p}_{g,t} - \Sigma_{d \in \mathcal{D}_{i''}} \hat{p}_{i'',d,t} - \Sigma_{f \in \mathcal{F}_{i''}^T} \hat{P}_{f,t}) ; ii' \in L^T, t \in T \quad (37)$$

EXAMPLES

Examples of the foregoing models and methods were simulated to gauge whether such models and methods may be feasibly implemented in current ISO energy markets. Simulations used the 1888-bus transmission system from the MATPOWER library, together with multiple interconnected distribution systems, to evaluate example models and methods in terms of solution quality and computational performance. Each of the simulated distribution systems was connected to the transmission system through one or two interconnection buses, referred to as Type DS-1 and Type DS-2 distribution systems. Modified based on the 33-bus distribution system, both types of distribution systems included 8 DERs and 34 lines forming a looped topology. Distribution systems of the same type were identical except for their interconnection buses.

In each distribution system, power flows of all 34 lines are monitored via constraint (19), and voltage magnitudes of all 33 buses are monitored via constraint (20), with $V_i^{LB}/V_i^{UB}$ of 0.95 p.u./1.05p.u. In addition, electricity bidding prices of DERs were set to be generally lower than those of thermal units in the transmission system. A summary of four simulations follows in table 1.

TABLE 1

SUMMARY OF CASES

| Case | Distribution systems | | Solving models |
|---|---|---|---|
| | Number | Type | |
| 1 | 5 | DS-2 | Full Model; Full Model$^{UC}$ |
| 2 | 10 | DS-2 | Proposed Model; Proposed Model$^{UC}$ |
| 3 | 15 | DS-2 | Simplified Model |
| 4 | 15 | DS-1 | Full Model; Full Model$^{SF}$ Proposed Model$^{SF}$ |

In Table 1 for cases 1-3, the following terms have the following meanings:

Full Model: Operation feasible region (12)-(24) and coupling constraints (28)-(29);

Proposed Model: Operation feasible region projection (27) and coupling constraints (28)-(29);

Simplified Model: Constraints (23) and (38). For i'$\in \mathcal{J}_{i,d}^T$, $\hat{p}_{i',d,t}$ is limited in the range of $[P_i^{LB}, P_i^{UB}]$.

$$+ \Sigma_{i \in \mathcal{J}_d^B} \Sigma_{i' \in \mathcal{J}_{i,d}^T} \hat{p}_{i',d,t} = \Sigma_{f \in \mathcal{F}_d^D} P_{f,t} ; t \in T \quad (38)$$

In the simplified model, current practices of ISOs may be implemented, such as having DERs in distribution systems directly bid at the interconnection buses. In other words, the distribution network constraints may be neglected, and injections from the transmission system may be freely deployed on interconnection buses. Moreover, the full model and proposed model may be further extended to consider unit commitment status of DERs by replacing (23)-(24) with (31)-(32) and replacing (27) with (34). These two variations are referred to as full model$^{UC}$ and proposed model$^{UC}$.

In case 4 of Table 1, all distribution systems are single-bus interconnected to the transmission system, so the ISO energy market model may be formulated by shift factors as follows:
Objective: (1)
Subject to: (4)-(10) and (36)-(37)
Case 4 studies two additional models, referred to as full model$^{SF}$ and proposed model$^{SF}$:
Full Model$^{SF}$: Feasible region (12)-(24) as well as coupling constraints (28) and (39);

$$\theta_{i,t} = 0; i \in \mathcal{J}_d^B, t \in T \quad (39)$$

Proposed Model$^{SF}$: Feasible region projection (35) and coupling constraint (28).

The feasible region projection method, including Gaussian elimination, Fourier-Motzkin elimination, and the embedded filtering strategies, may be implemented with Python. Fraction package may be used to enable fraction calculations. The boundary filtering strategy may be applied on both types of distribution systems. For $\theta_{i,t}$ (i$\in \mathcal{J}_d^B$), we set the range as [−35°, +35°]. All optimization problems are mixed integer linear programming models, which may be implemented in MATLAB and solved by Gurobi 9.0.0. All numerical simulations were conducted on a personal computer with an i7-3.6 GHz CPU and 16 GB RAM.

For a DS-2 distribution system studied in cases 1-3, at time t=1 for instance, it takes 125.56 seconds for the projection process to generate 74 constraints of (27). When unit commitment status of DERs is further considered, at time t=1, 89 constraints of (34) are generated in 185.51 seconds. It is worthwhile to emphasize that feasible region projections of individual time intervals can be implemented in parallel fashion. The market clearing results of the full model and the proposed model are compared in Table 2. All the cases are solved to zero MIP gap for fair comparison.

As shown in Table 2, the two models derive identical objectives in each case, which verifies the ability of the proposed model in fully capturing the impacts of physical and economic features of the distribution systems to the transmission system. In terms of computational performance, computational burden increases with the increasing number of distribution systems. The proposed model significantly outperforms the full model in all three cases, especially when more distribution systems are connected, showing that the proposed model presents computational efficiency, while showing the other advantages as discussed above.

TABLE 2

| | Full Model | | Proposed Model | |
| --- | --- | --- | --- | --- |
| Case | Objective ($) | Solving time (s) | Objective ($) | Solving time (s) |
| Case 1 | 32,201,361.39 | 105.96 | 32,201,361.39 | 72.86 |
| Case 2 | 32,204,065.73 | 145.35 | 32,204,065.73 | 77.31 |
| Case 3 | 32,206,766.45 | 179.92 | 32,206,766.45 | 103.29 |

The proposed model and the simplified model were also compared in terms of physical feasibility against distribution system constraints (12)-(24). With an ISO market clearing result to desired variables $\mathcal{V}_d^D$ from the proposed model or the simplified model, a solution to (12)-(24) can be recovered, if deemed feasible. Table 3 shows that feasible solutions to distribution systems can always be recovered with results from the proposed model in all three cases, while infeasibility consistently occurs with the simplified model. This verifies effectiveness of the feasible region projection in respecting distribution systems' internal physical limits, which also shows the necessity of considering internal physical limits of distribution systems in ISO energy market clearing. This also explains why the simplified model derives lower objective values and shorter solving time than the proposed model.

TABLE 3

| | Proposed Model | Simplified Model | | |
| --- | --- | --- | --- | --- |
| Case | Feasibility to (12)-(24) | Objective ($) | Solving time (s) | Feasibility to (12)-(24) |
| Case 1 | Yes | 32,201,250.62 | 68.21 | No |
| Case 2 | Yes | 32,203,841.88 | 69.28 | No |
| Case 3 | Yes | 32,206,433.34 | 67.22 | No |

Figure 6:
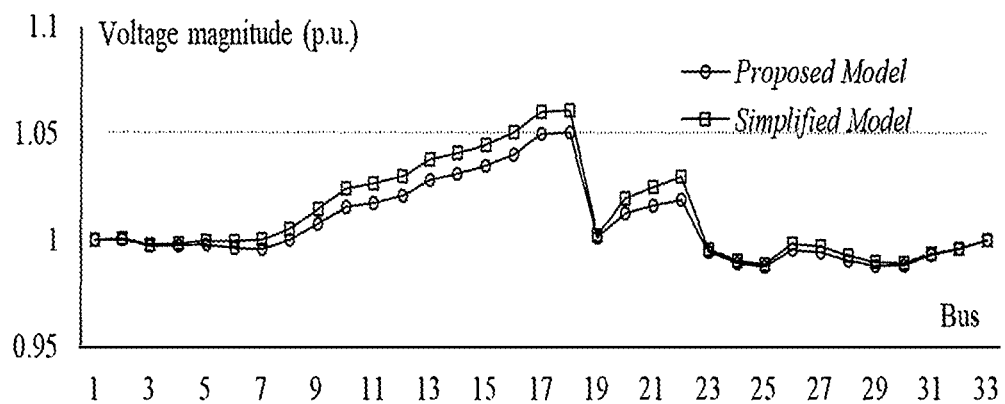
FIG. 6 shows recovered voltage profiles with results from Proposed Model and Simplified Model according to an embodiment of the first aspect of the present disclosure.

Looking more closely at case 1, with results from the proposed model, the recovered bus voltage profile in one distribution system at hour 12 is shown in FIG. 6. It can be seen that in the proposed model, voltage at bus 18 reaches the upper limit (i.e., $V_i^{UB}=1.05$). That is, constraint (20) is binding, which is mainly caused by active power injections of DERs connected at this bus. This verifies the effectiveness of constraint (27) in respecting distribution systems' internal limits. On the other hand, no feasible solution to the distribution system can be recovered based on the results from the simplified model. In recognizing the binding status of voltage constraints and the ignorance of couplings on $p_{i,t}$, if constraint (20) on buses 17 and 18 are removed and slack variables are added in the power balance constraints, a solution to the distribution system could be recovered. Recovered voltage profile is compared in FIG. 6, which shows that voltage of bus 18 is 1.0603 p.u., violating the upper bound, which is one reason of infeasibility. Indeed, values of slack variables in power balance constraints of the two interconnection buses are both non-zeros (i.e., one is −4.16 MW and the other is +4.16 MW). That is, net power injections of the two interconnection buses will deviate −4.16 MW and +4.16 MW from the results cleared in the ISO market to align with the given voltage phase angles of interconnection buses.

Market clearing results of the full model$^{UC}$ and the proposed model$^{UC}$ are compared in Table 4. The MIP gap threshold is set as 0.01‰, as seeking zero MIP gap solutions would cause trivial ON/OFF status switching on DERs and dramatically increase the solving time for both models. Indeed, similar observations as in Table 2 can be made, in terms of solution quality and computational performance. The slight difference in objectives of the two models in Case 2 and Case 3 are caused by non-zero MIP gap. In addition, comparing with Table 2, higher objectives are observed because no-load costs of DERs are considered. Although avoiding seeking zero MIP gap solutions contributes to lower computational time of Case 1 and Case 2 in Table 4, it also shows that considering unit commitment of DERs does not necessarily lead to higher computational burden.

TABLE 4

| | Full Model$^{UC}$ | | Proposed Model$^{UC}$ | |
| --- | --- | --- | --- | --- |
| Case | Objective ($) | Solving time (s) | Objective ($) | Solving time (s) |
| Case 1 | 32,203,913.95 | 102.16 | 32,203,913.95 | 64.02 |
| Case 2 | 32,208,873.36 | 138.85 | 32,208,880.51 | 70.72 |
| Case 3 | 32,213,981.24 | 194.52 | 32,213,974.09 | 118.96 |

In case 4, all distribution systems are Type DS-1, and $\theta_{i,t}$ is not needed to formulate the coupling between transmission and distribution systems. As expected, the projected feasible region has fewer constraints as compared to Type DS-2. For instance, at time t=1, constraint (35) contains 19 constraints after final filtering, as compared to 74 constraints from (27).

Market clearing results from the full model, full model$^{SF}$, and proposed model$^{SF}$ are compared in Table 5. As seen in Table 5, the three models yield identical objectives, which indicates they can all correctly capture the physical limits and economic features of distribution systems. However, full model$^{SF}$ and proposed model$^{SF}$ dramatically outperform full model in terms of computational time, which shows the advantage of applying shift factors. This is because of much fewer variables and constraints. Moreover, computational time of proposed model$^{SF}$ is slightly shorter than that of full model$^{SF}$.

In addition, from the full model, voltage phase angles of buses in distribution system can be obtained directly. For instance, $\theta_{i,t}$ of bus 1 and bus 33 at time t=1 are −10.42° and −9.76°. In comparison, the other two models will have to conduct additional calculations to calculate voltage phase angles of distribution systems. The additional calculations involve solving equations (2)-(3) with known dispatches and then recovering the undesired variables.

TABLE 5

| Model | Full Model | Full Model$^{SF}$ | Proposed Model$^{SF}$ |
|---|---|---|---|
| Objective ($) | 32,205,601.35 | 32,200,973.20 | 32,200,973.20 |
| Solving time (seconds) | 135.70 | 28.91 | 24.58 |

Accordingly, the present disclosure presents systems and methods that may apply a feasible-region-projection-based approach for integrating primary distribution systems with proliferated DERs into the ISO energy market. Embodiments utilizing a proposed model are practically applicable in the current ISO energy market platform and do not require ISO collecting configuration details of or conducting an iterative procedure with the distribution systems. Case studies illustrate that the proposed model can fully capture economic features of distribution systems and respect their internal physical limits, while is also computationally more efficient than the full model with the exhaustive formulation of distribution systems.

Second Aspect of the Present Disclosure

Figure 7:
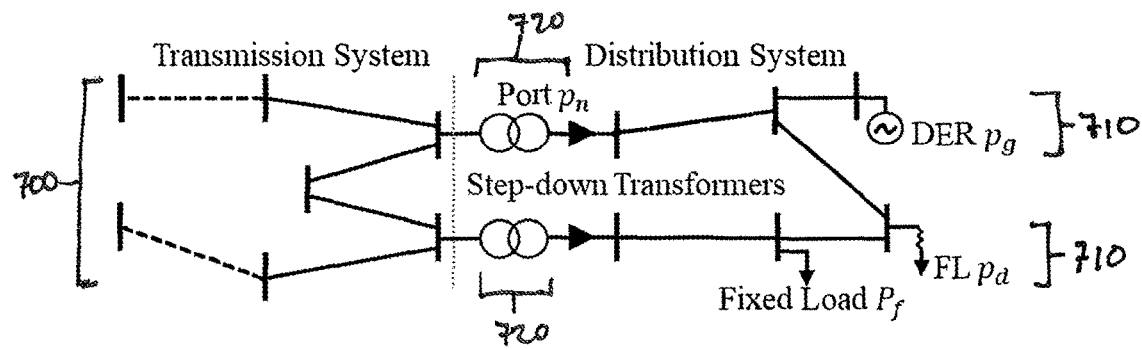
FIG. 7 shows an illustrative example of the system topology according to an embodiment of the second aspect of the present disclosure.

Embodiments of a second aspect of the present disclosure may relate to a network containing one transmission system 700 and multiple interconnected primary distribution systems 710. Each distribution system 710 may have either a radial topology or a looped topology. Each distribution system 710 may be connected to the transmission system 700 by multiple interconnection buses through step-down transformers 720. In this aspect of the disclosure, the word port may refer to a step-down transformer 720. FIG. 7 provides an example illustration of the foregoing system topology. System topology may include a transmission system 700 and one or more distribution systems 710 interconnected with the transmission system 700 by a plurality of ports 720. In an embodiment, the ports 720 may be step-down transformers 720.

As used in the discussion of this aspect of the present disclosure, indices of distribution systems and time intervals are not explicitly presented in the following formulations, which can be naturally extended to multiple distribution systems and multiple time intervals. Notations $\mathcal{I}$, $\mathcal{L}$, $\mathcal{G}$, $\mathcal{D}$, and $\mathcal{F}$ denote sets of buses, lines, DERs, flexible loads, and fixed loads in a distribution system, which are respectively indexed by i, l, g, d, and f; $\mathcal{G}_i$, $\mathcal{D}_i$, and $\mathcal{F}_i$ denote sub-sets of corresponding assets connected at bus i; $\mathcal{N} = \{1 \ldots N\}$ denotes the set of ports and is indexed by n; variables $p_g$ and $p_d$ denote dispatches of DER g and FL d; $P_f$ represents demand level of fixed load f; variable $p_n$ denotes power flow injected into the distribution system through port n. $\hat{\cdot}$ is used to indicate known solution of a variable.

Figure 8:
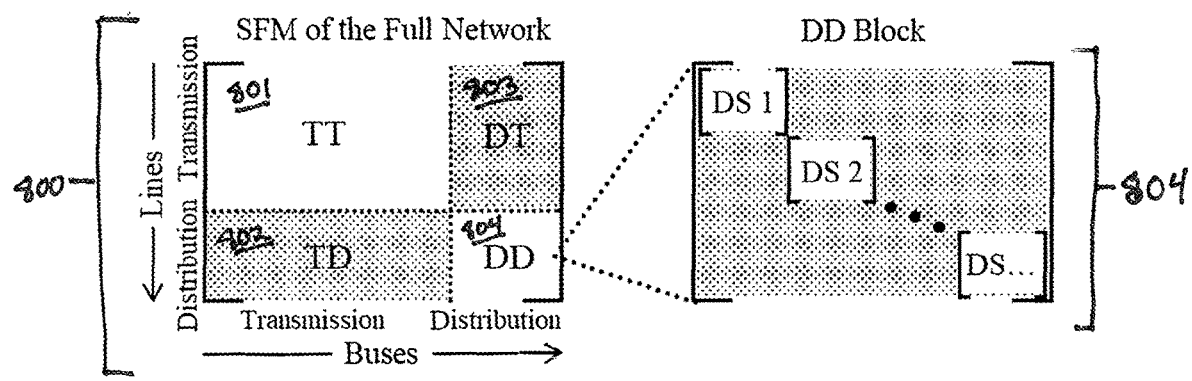
FIG. 8 shows a structure of the SF matrix for the full network according to an embodiment of the second aspect of the present disclosure.

Embodiments of this aspect of the present disclosure may apply a multi-port power-exchange model. An ISO may have network data of all primary distribution systems in the ISO and may construct a shift-factor ("SF") matrix 800 of the network (e.g., the transmission network and multiple distribution networks). The ISO network may be represented by choosing one transmission bus as a reference and including four sub-blocks 801, 802, 803, 804 in the SF matrix of the network, as represented in FIG. 8. The four sub-blocks may have the following characteristics:

The Transmission-to-Transmission (TT) Sub-block 801 calculates impacts of net power injections of transmission buses to power flows on transmission lines.

The Transmission-to-Distribution (TD) Sub-block 802 calculates impacts of net power injections of transmission buses to power flows on distribution lines.

The Distribution-to-Transmission (DT) Sub-block 803 calculates impacts of net power injections of distribution buses to power flows on transmission lines.

The Distribution-to-Distribution (DD) Sub-block 804 calculates impacts of net power injections of distribution buses to power flows on distribution lines of individual distribution systems.

When applied back to the ISO energy market clearing model, each transmission line constraint can be formulated via the corresponding row of TT and DT sub-blocks, and each distribution line constraint can be formulated via the corresponding row of TD and DD sub-blocks, together with power dispatch variables of all assets in transmission and distribution systems. In practice, however, the ISO may not know dynamic information on DERs, flexible loads, and fixed loads of distribution systems. Moreover, including all distribution line constraints as well as dispatch variables of individual DERs and flexible loads in the ISO's energy market clearing model could introduce significant computational complexity and deteriorate market-clearing efficiency. Applications of a multi-port power-exchange model may help in this regard.

A multi-port power-exchange model may make the following approximations. First, the TD sub-block can be reasonably approximated as zeros, as per-unit reactance values of distribution lines as well as step-down transformers connecting transmission and distribution networks are comparable to those of transmission lines. Thus, when injecting power into a transmission bus and withdrawing from the reference bus, corresponding power flows passing through a multi-port distribution system would be negligible. Second, for the same reason as the TD sub-block, shift factors ("SFs") of a distribution line with respect to buses of other distribution systems are negligible. Thus, all off-diagonal sub-blocks of the DD sub-block can be set as zeros. The diagonal sub-blocks represent SFs of individual distribution systems. Third, as power exchanges between the transmission system and distribution systems are through ports, the overall impact of assets in a distribution system on a transmission line can be approximated as the product of $p_n$, and corresponding SFs of the interconnection buses in the TT sub-block. Therefore, the DT sub-block can be set as zero.

In summary, the TD sub-block, the DT sub-block, and the diagonal sub-blocks of the DD sub-block, as shaded in FIG. 8, are approximated as zeros.

With the above assumptions, a transmission line constraint can be formulated via the corresponding row of the TT block and dispatch variables of assets in the transmission system; similarly, a distribution line constraint is related only to the corresponding row from the DD sub-block and dispatch variables of assets in its own distribution system. Moreover, in the ISO energy market model, each distribution system can be simulated via net power injection variables $p_n$, ($n \in \mathcal{N}$) as shown in FIG. 8, together with linear constraint (40) that involves only $p_n$. Constraint (40), constructed via the DD sub-block, simulated physical operation features of distribution systems. Constraint (40) describes electrical coupling between $p_n$ ($n \in \mathcal{N}$) of multiple ports, guaranteeing that if $\hat{p}_n$ is a feasible solution to (40), there must exist $\hat{p}_g$ and $\hat{p}_d$, such that $\hat{p}_n$, $\hat{p}_g$, and $\hat{p}_d$ together correspond to a physically feasible operation status of the distribution system. In (40), $A_{h,n}$ is the generated coefficient to $p_n$; $B_h$ is the generated constant term; $\mathcal{H}$ denotes the set of generated constraints, indexed by h. The feasible region enclosed by (40) may be denoted in this aspect as $\mathcal{P}$. (40) may be represented as follows:

$$\sum_{n\in\mathcal{N}} A_{h,n} \cdot p_n \le B_h; \; h \in \mathcal{H} \quad (40)$$

Figure 9:
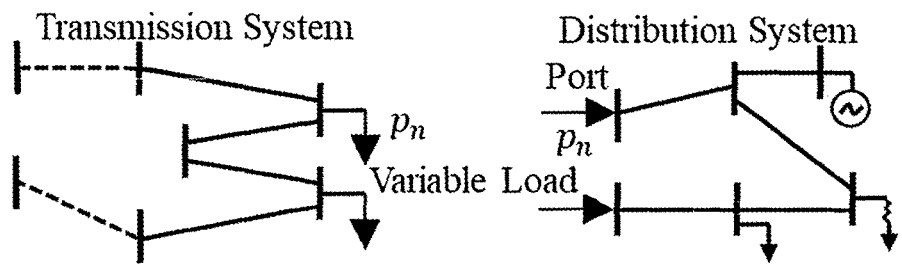
FIG. 9 shows an example of a multi-port power exchange model for distribution systems according to an embodiment of the second aspect of the present disclosure.

At a high level, the ISO energy market clearing problem may be solved with a proposed multi-port power exchange model as follows: (i) the DD sub-block of a distribution system is calculated by the ISO in a centralized way and released to the DSO, with which the DSO prepares the multi-port power exchange model (40) and submits it to the ISO; (ii) the ISO solves the energy market model, which incorporates multi-port power exchange models (40) of individual distribution systems to reflect their physical operation characteristics, and also includes $p_n$ and corresponding elements of the TT sub-block in each transmission line constraint to simulate impacts of distribution systems on transmission network constraints. FIG. 9 provides a diagram of a multi-port power exchange model for distribution systems according to an embodiment of the present aspect of the disclosure.

It may be advantageous to construct an operation feasible region for a distribution system with the DD sub-matrix of a distribution system released by the ISO. The operation feasible region may be formulated as in (41)-(45) using variables $p_n$, $p_g$, and $p_d$. Power flows on internal distribution lines are constrained by (41), while power flows on ports $p_n$ are explicitly written as in (42) and constrained by (43), where $SF_{l,i}/SF_{n,i}$ is shift factor of bus i to line l/port n from the DD sub-matrix. Moreover, capacity limits of distribution line l and port n are denoted as $F_l^{UB}$ and $F_n^{uB}$; dispatch ranges of DER g and FL d are represented as $[P_g^{LB}, P_g^{UB}]$ and $[P_d^{LB}, P_d^{UB}]$. It is noteworthy that power balance of the distribution system is implicated by constraint (44).

(41)-(45) may be formulated as follows:

$$-F_l^{UB} \le \sum_{i\in\mathcal{I}} SF_{l,i} \cdot (\sum_{g\in\mathcal{G}_i} p_g - \sum_{d\in\mathcal{D}_i} p_d - \sum_{f\in\mathcal{F}_i} P_f) \le F_l^{UB}; \; l \in \mathcal{L} \quad (41)$$

$$p_n = \sum_{i\in\mathcal{I}} SF_{n,i} \cdot (\sum_{g\in\mathcal{G}_i} p_g - \sum_{d\in\mathcal{D}_i} p_d - \sum_{f\in\mathcal{F}_i} P_f); \; n \in \mathcal{N} \quad (42)$$

$$-F_n^{UB} \le p_n \le F_n^{UB}; \; n \in \mathcal{N} \quad (43)$$

$$P_g^{LB} \le p_g \le P_g^{UB}; \; g \in \mathcal{G} \quad (44)$$

$$P_d^{LB} \le p_d \le P_d^{UB}; \; d \in \mathcal{D} \quad (45)$$

The multi-port power exchange model (40) can be constructed from (41)-(45) by Gaussian elimination and Fourier-Motzkin elimination via two steps: (i) equality constraints (42) are reformatted in a row echelon form by Gaussian elimination to substitute part of $p_g$ and $p_d$ in other constraints; (ii) Fourier-Motzkin elimination further discards remaining $p_g$ and $p_d$ in other constraints iteratively. As discussed with respect to the first aspect of the disclosure, Fourier-Motzkin is, in theory, exponentially complex. Accordingly, one or more of the following three strategies may be utilized to remove redundant constraints generated in each iteration to mitigate the growth of inequality constraints, thus accelerating the algorithm.

One strategy for removing redundant constraints may involve applying Imbert's acceleration theorems, a low-computational effort that keeps track of ancestor constraints; a new constraint is considered redundant if conditions are satisfied by its ancestors.

Another strategy for removing redundant constraints may involve boundary filtering. In boundary filtering, upper and lower bounds of variables in (43)-(45) may be used to further filter out redundant constraints with low computational efforts. That is, for a constraint in the standard "≤" form, its maximum possible value can be calculated by substituting the variable with a positive/negative coefficient via its upper/lower bound. If strictly less than still holds with the maximum possible value, this constraint is redundant and can be dropped.

Another strategy for removing redundant constraints may include linear programming ("LP") filtering. LP filtering applies similar ideas as boundary filtering but uses LP-based optimization approaches to identify the maximum possible value. Specifically, the maximum possible value of a constraint can be calculated by maximizing this constraint term as an objective, subject to all remaining constraints. LP filtering may have a stronger filtering ability but a higher computational burden than applying boundary filtering or Imbert's acceleration theorems.

Figure 10:
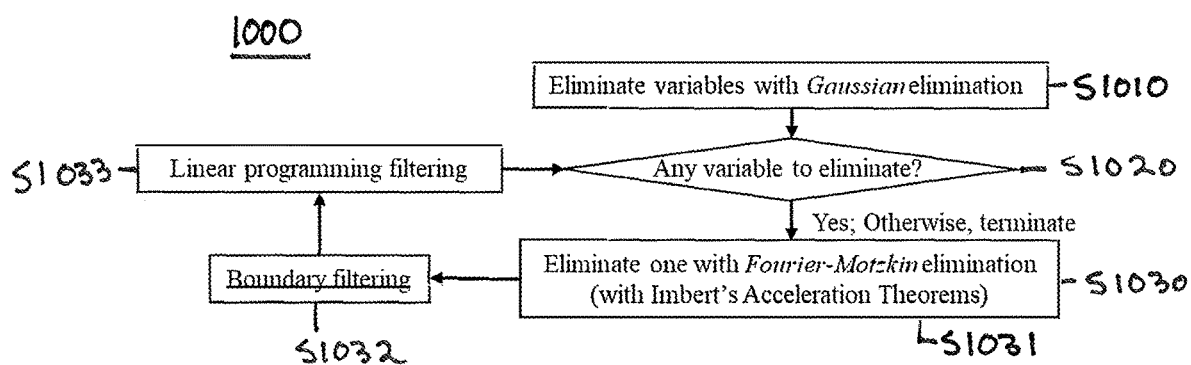
FIG. 10 shows a flowchart of the variable elimination process according to an embodiment of the second aspect of the present disclosure.

FIG. 10 shows an example flowchart 1000 for implementing these strategies sequentially according to an embodiment of this aspect of the present disclosure. As shown in FIG. 10, one or more variables may be eliminated with Gaussian elimination in step S1010. After step S1010, the process moves to step S1020, querying whether there are any variables to eliminate. If the answer to the query of step S1020 is anything but "yes," the process terminates. If the answer to the query of step S1020 is "yes," the process proceeds to step S1030, which eliminates at least one variable with Fourier-Motzkin elimination. As part of the Fourtier-Motzkin elimination in step S1030, redundant constraints may be removed. In an embodiment, Imbert's acceleration theorems may be applied in sub-step S1031. After applying Imbert's acceleration theorems, boundary filtering may be applied in sub-step S1032. And after applying boundary filtering, LP filtering may be applied in sub-step S1033. The process may return back to step S1020, where it continues. The sub-steps S1031-S1033 may be applied in order of lowest computational effort to most computational effort to take advantage of redundancies first identified through low computational effort strategies before committing relatively more computational effort on more intensive strategies.

Given the foregoing approximation efforts to improve computational efficiency, it is possible that the multi-port power exchange model may introduce errors into the line flow results for both the transmission and distribution networks. Firstly, approximating the TD sub-block as zero (i.e., ignoring impacts of transmission bus injections on distribution lines) could introduce errors on power flows of distribution systems. Two factors impact the magnitude of such line flow errors: (i) significance of shift factors in the original TD sub-block, and (ii) magnitudes of power injections at transmission buses. The fact that elements in the TD sub-block are relatively small is considered as a prerequisite to apply the proposed multi-port power exchange model.

Secondly, equating a distribution system as variable loads with corresponding shift factors in the TT sub-block could induce power flow errors of transmission lines. The reason is that, in order to get exact power flows of transmission lines under this equivalence, one would need to use shift factors of interconnection buses corresponding to the network with the removal of this distribution system. Those values are slightly different from the elements in the TT sub-block, which are calculated corresponding to the full network and flow diversion of all distribution systems has been fully taken into account. Indeed, such differences may become relatively larger for transmission lines closer to the interconnection buses.

Figure 11:
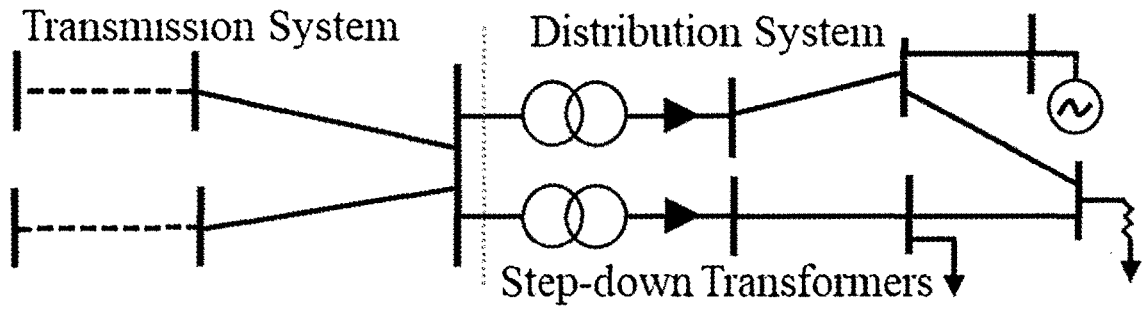
FIG. 11 shows an example of special occasions without line flow errors according to an embodiment of the second aspect of the present disclosure.

Thirdly, setting off-diagonal sub-blocks of the DD sub-block as zeros ignores the interaction between distribution systems, which, although very tiny, could still result in line flow errors on distribution lines. Yet line-flow errors may be effectively avoided in certain cases, such as when all ports are connected at a single interconnection bus of the transmission network, as shown in FIG. 11. Another such case is when N=1 (a single port).

The multi-port power exchange model discussed above focuses on physical operation features of distribution systems. In order to further address their economic features, several bidding model construction approaches are presented for distribution systems with different numbers of ports. With price information from all DERs and flexible loads in a distribution system, applying these approaches can help the DSO construct a bidding model submitted to the ISO for energy market clearing. For the sake of discussion, a single-segment cost function is considered for each DER/flexible load.

Operating cost of a distribution system in the ISO energy market is jointly determined by $p_n$ of all ports. In addition, with given $\hat{p}_n$ ($n \in \mathcal{N}$) satisfying (40), the total operating cost of the distribution system can be optimized via a self-dispatch problem (46)-(48), where $C_g/C_d$ is the price of DER g/flexible load d. Therefore, deriving a cost function associated with $p_n$ over the entire $\mathcal{P}$ may be a focus, while the cost function value to each $\hat{p}_n$ may be close to the optimal objective $C(\hat{p}_n)$ of (46)-(48). As the cost function associated with $p_n$ is related to the optimal solution to (46)-(48) over the entire $\mathcal{P}$, its analytical form may not be obtained easily. To this end, alternatively, the cost function may be approximated via a piecewise linear function, in which the operating cost is linearly associated with $p_n$ ($n \in \mathcal{N}$), thereby integrable to the ISO energy market model. Two alternative formulations, i.e., a piecewise linear formulation and a logarithmic formulation may be introduced to formulate the piecewise linear function. The following discussions begin with the case of N=1, then extend to cases of N=2 and N≥3. (46)-(48) may be represented as follows:

$$\min C(\hat{p}_n) = \Sigma_{g \in \mathcal{G}} C_g \cdot p_g - \Sigma_{d \in \mathcal{D}} C_d \cdot p_d \quad (46)$$

Constraints (41) and (44)-(45); (47)

$$\hat{p}_n = \Sigma_{i \in \mathcal{I}} SF_{n,i} \cdot (\Sigma_{g \in \mathcal{G}_i} p_g - \Sigma_{d \in \mathcal{D}_i} p_d - \Sigma_{f \in \mathcal{F}_i} P_f); n \in \mathcal{N} \quad (48)$$

For the case of N=1, the approximated piecewise linear function is univariate on $p_1$, and is not necessarily monotonically increasing. The number of equidistant segments may be set as $2^M$, for an integer parameter M. The set of segments may be collected in $\mathcal{S} = \{1, \ldots, 2^M\}$, and indexed by s. The set of endpoints may be denoted as $\mathcal{K} = \{1, \ldots, 2^M+1\}$, and indexed by k and k'. In the one-dimensional space, these segments may be 2-simplexes, thereby each endpoint may correspond to a vertex and may be associated with variable $\lambda_k$. Finally, set $\mathcal{J}^2$ may be used to collect all 2-simplexes and index them by j. The neighbor simplex of a vertex may refer to a simplex that contains this vertex. Neighbor 2-simplexes of a vertex k may be collected in set $\mathcal{J}_k^2$.

A piecewise linear formulation can be represented as in (49)-(54). Operating cost of the distribution system is calculated as in (49), where $C_k^V$ is operating cost corresponding to vertex k. Importantly, this term will be included in the objective of the ISO energy market to represent economic feature of the distribution system. Constraint (50) defines simplexes. Constraint (51) calculates $p_1$, i.e., power flow through the port, where $P_{1,k}^V$ is the value of $p_1$ at vertex k. Constraint (52) forces one and only one simplex to be active, where binary variable $\mu_j$ indicates status of 2-simplex j (i.e., 1: active, 0: inactive). Constraint (53) forces $\lambda_k$ within [0,1], and to be non-zero only if one of its neighbor simplexes is active. Constraint (54) defines binary variables. Constraints (49)-(54) may be represented as follows:

$$\Sigma_{k \in \mathcal{K}} C_k^V \cdot \lambda_k; \quad (49)$$

$$\Sigma_{k \in \mathcal{K}} \lambda_k = 1; \quad (50)$$

$$p_1 = \Sigma_{k \in \mathcal{K}} P_{1,k}^V \cdot \lambda_k; \quad (51)$$

$$\Sigma_{j \in \mathcal{J}^2} \mu_j = 1; \quad (52)$$

$$0 \leq \lambda_k \leq \Sigma_{j \in \mathcal{J}_k^2} \mu_j; k \in \mathcal{K} \quad (53)$$

$$\mu_j \in \{0,1\}; j \in \mathcal{J}^2 \quad (54)$$

A logarithmic formulation may map a full set of M-bit Gray code ($2^M$ codes) to the $2^M$ segments in sequence. The code corresponding to segment s may be represented as $R_s$. Set $\mathcal{V}$ may be defined as $\{1 \ldots M\}$, and is mapped with bits of the M-bit Gray code. Operator sup($\cdot$) returns non-zero bits of a Gray code. $v \in \sup(\cdot)$ is true if bit v is included in the returned non-zero bits; otherwise, it is false. Furthermore, $\mathcal{S}_k$ means the set of segments that contain endpoint k. It is clear that cardinality of $\mathcal{S}_k$ is either 1 or 2. The logarithmic formulation may be built by replacing (51)-(54) with (55)-(58), where $u_{1,v}$ is an indicator that identifies the active 2-simplex jointly. (55)-(58) may be represented as follows:

$$\Sigma_{k \in \{k' \in \mathcal{K} | \forall s \in \mathcal{S}_{k'}, v \in \sup(R_s)\}} \lambda_k \leq u_{1,v}; v \in \mathcal{V} \quad (55)$$

$$\Sigma_{k \in \{k' \in \mathcal{K} | \forall s \in \mathcal{S}_{k'}, v \notin \sup(R_s)\}} \lambda_k \leq 1 - u_{1,v}; v \in \mathcal{V} \quad (56)$$

$$0 \leq \lambda_k \leq 1; k \in \mathcal{K} \quad (57)$$

$$u_{1,v} \in \{0,1\}; v \in \mathcal{V} \quad (58)$$

Comparing with the piecewise linear formulation which introduces $2^M$ binary variables, logarithmic formulation only introduces M binary variables, i.e., log $2(2^M)$. Consequently, a higher computation performance is expected.

Figure 12:
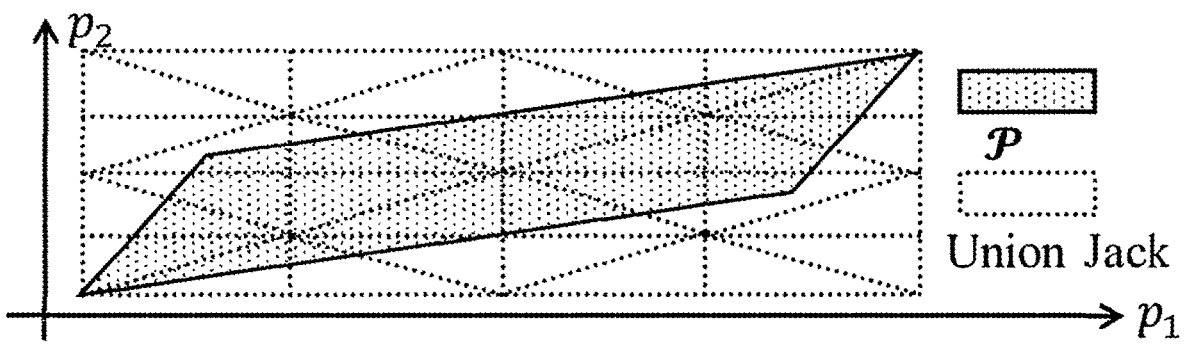
FIG. 12 shows a polygon of $\mathcal{P}$ and the Union Jack structure according to an embodiment of the second aspect of the present disclosure.

In the case of N=2, $\mathcal{P}$ becomes a polygon in the two-dimensional rectangular coordinates as shown in FIG. 12. The bivariate cost function may be approximated within a triangulated domain in the Union Jack structure, as the grid of dashed lines shown in FIG. 12. That is, $\mathcal{P}$ may be divided by 3-simplexes arranged in a specific structure, and cost of any point in a 3-simplex can be linearly approximated via values of its three vertices.

The numbers of equidistant segments on the two dimensions are both set as $2^M$. Therefore, definitions of $\mathcal{S}$ and $\mathcal{K}$ can be applied on each of the two dimensions. Each vertex of the grid is uniquely tagged by a pair of coordinates k, k' $\in \mathcal{K}$, and associated with variable $\lambda_{k,k'}$. Furthermore, the definition of $\mathcal{J}^3$ remains the same but collects 3-simplexes, while $\mathcal{J}_k^2$ is expanded to $\mathcal{J}_{k,k'}^3$ to collect neighbor 3-simplexes of vertex (k, k').

A piecewise linear formulation may be presented for the N=2 case in (59)-(64), similar to constraints (49)-(54) for the N=1 case. $C_{k,k'}^V$ and $P_{n,k,k'}^V$ are the operating cost and the value to $p_n$ ($n \in \{1,2\}$) at vertex (k, k'); binary variable $\mu_j$ works similarly as (52)-(53) in the N=1 bidding model, but indicates 3-simplexes in the N=2 bidding model.

$$\Sigma_{k,k' \in \mathcal{K}} C_{k,k'}^V \cdot \lambda_{k,k'}; \quad (59)$$

$$\Sigma_{k,k' \in \mathcal{K}} \lambda_{k,k'} = 1; \quad (60)$$

$$p_n = \Sigma_{k,k' \in \mathcal{K}} P_{n,k,k'}^V \cdot \lambda_{k,k'}; n \in \{1,2\} \quad (61)$$

$$\sum_{j \in \mathcal{J}^3} \mu_j = 1; \tag{62}$$

$$0 \leq \lambda_{k,k'} \leq \sum_{j \in \mathcal{J}^3_{k,k'}} \mu_j \; ; \; k,k' \in \mathcal{K} \tag{63}$$

$$\mu_j \in \{0,1\}; \; j \in \mathcal{J}^3 \tag{64}$$

A logarithmic formulation may be built by replacing (61)-(64) with (65)-(73). Besides applying a full set of M-bit Gray code and defining $\mathcal{V}$ and $\mathcal{S}_k$ on each dimension, set $\mathcal{K}$ is divided into two sub-sets of $\mathcal{K}^{EVE}$ and $\mathcal{K}^{ODD}$, respectively containing even and odd values in $\mathcal{K}$. In constraints (65)-(70), the selection indicators are expanded to binary variables $u_{n,v}$, $n \in \{1,2\}$, and z. Their combination ultimately identifies the active 3-simplex, forcing all $\lambda_{k,k'}$ as zero except those three in the active 3-simplex. It is emphasized that the logarithmic formulation is specific for grids in the Union Jack structure. In the grid, $u_{n,v}$, $n \in \{1,2\}$ reduces choices of 3-simplexes in a way of dichotomy on two dimensions, and finally locates to two 3-simplexes in a small square. Finally, variable z decides which 3-simplex will be picked.

$$\sum_{k \in \mathcal{K}} \sum_{k' \in \{k'' \in \mathcal{K} | \forall s \in \mathcal{S}_{k''}, v \in sup(R_s)\}} \lambda_{k,k'} \leq u_{1,v}; \; v \in \mathcal{V} \tag{65}$$

$$\sum_{k \in \mathcal{K}} \sum_{k' \in \{k'' \in \mathcal{K} | \forall s \in \mathcal{S}_{k''}, v \in sup(R_s)\}} \lambda_{k,k'} \leq u_{2,v}; \; v \in \mathcal{V} \tag{66}$$

$$\sum_{k \in \mathcal{K}} \sum_{k' \in \{k'' \in \mathcal{K} | \forall s \in \mathcal{S}_{k''}, v \in sup(R_s)\}} \lambda_{k,k'} \leq 1 - u_{1,v}; \; v \in \mathcal{V} \tag{67}$$

$$\sum_{k' \in \mathcal{K}} \sum_{k \in \{k'' \in \mathcal{K} | \forall s \in \mathcal{S}_{k''}, v \notin sup(R_s)\}} \lambda_{k,k'} \leq 1 - u_{2,v}; \; v \in \mathcal{V} \tag{68}$$

$$\sum_{k \in \mathcal{K}^{EVE}, k' \in \mathcal{K}^{ODD}} \lambda_{k,k'} \leq z; \tag{69}$$

$$\sum_{k \in \mathcal{K}^{ODD}, k' \in \mathcal{K}^{EVE}} \lambda_{k,k'} \leq 1-z; \tag{70}$$

$$0 \leq \lambda_{k,k'} \leq 1; \; k,k' \in \mathcal{K} \tag{71}$$

$$u_{1,v}, u_{2,v} \in \{0,1\}; \; v \in \mathcal{V} \tag{72}$$

$$z \in \{0,1\} \tag{73}$$

Figure 13:
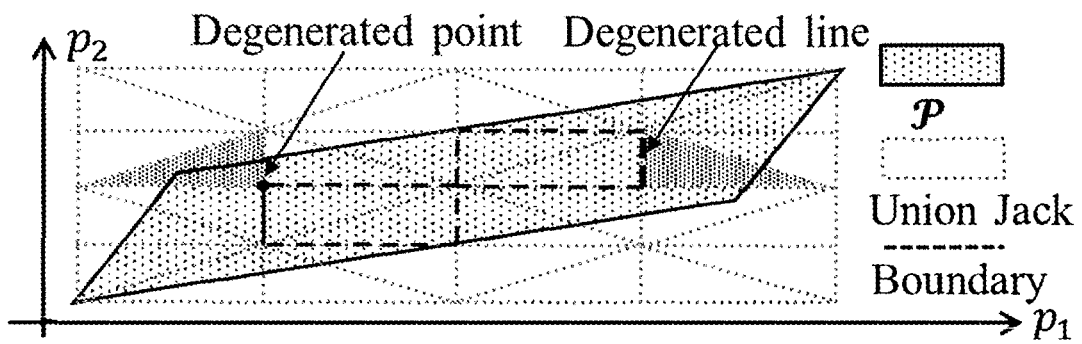
FIG. 13 shows n illustrations of a new boundary after excluding invalid vertices according to an embodiment of the second aspect of the present disclosure.

Firstly, as shown in FIG. 12, some vertices in the grid are outside $\mathcal{P}$, which indicates their corresponding $\hat{p}_n$ are infeasible to (46)-(48) and thereby no valid $C_{k,k'}^V$ is available. To address it, all $\lambda_{kk'}$ corresponding to vertices outside $\mathcal{P}$ may be set as zero, i.e. $\lambda_{kk'}=0$. In this way, a 3-simplex crossing the boundary of the region is essentially degenerated to an edge if two vertices are valid (see the shadow triangle on the right in FIG. 13), or a point if only one vertex is valid (see the shadow triangle on the left in FIG. 13). Finally, a new boundary shown as the dashed lines in FIG. 13 can be formed.

Figure 14:
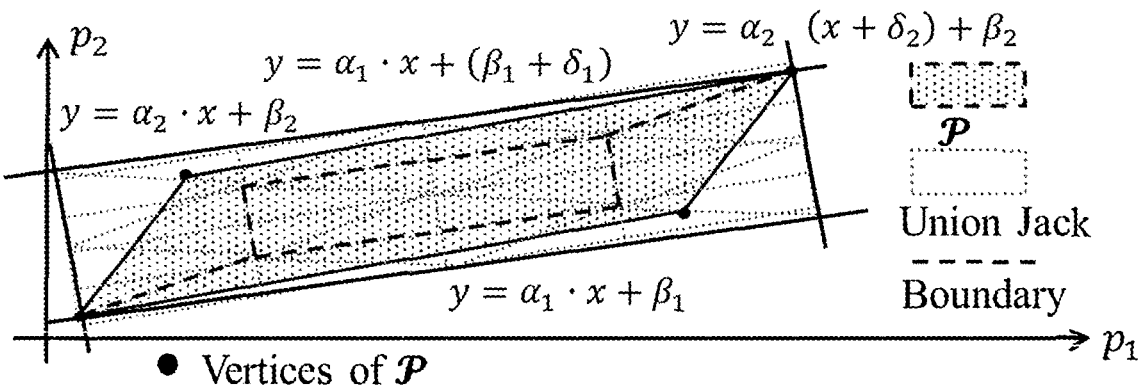
FIG. 14 shows an illustration of the fitted square domain according to an embodiment of the second aspect of the present disclosure.

Another issue is that the ratio of invalid vertices in the triangulated domain could be high, as the example in FIG. 12, while these vertices outside of $\mathcal{P}$ do not contribute to improving the linearization accuracy. It may be caused by the fact that the vertical square domain poorly fits the polygon of the projected feasible region. Here, we propose to solve the problem by (74)-(80), in order to find a square domain that overlaps with the polygon as much as possible, as shown in FIG. 14. The objective (74) is to minimize the area of the encircled rectangle. In this problem, two base lines are represented in the form of $y=\alpha_1 \cdot x + \beta_1$ and $y=\alpha_2 \cdot x + \beta_2$, where $\alpha_1$, $\alpha_2$, $\beta_1$, and $\beta_2$ are variables. The two lines are perpendicular as constrained by (75). Two other lines are used by shifting the two base lines in parallel along the coordinates. The distances shifted are represented by $\delta_1$ and $\delta_2$. Thus, these four lines encircle a rectangle. Constraint (76) specifies slope ranges of lines, and sets non-negative differences of intercepts to exclude solution ambiguity. Constraints (77)-(80) ensure every vertex of $\mathcal{P}$ is inside the rectangle. Vertices of $\mathcal{P}$ are represented by $F_{1,w}^V$ and $F_{2,w}^V$, and collected in set $\mathcal{W}$ and indexed by w. It is noteworthy that vertexes of $\mathcal{P}$ can be obtained from (40). To this end, the grid in Union Jack structure can be filled in the obtained rectangle domain. FIG. 14 clearly shows that, in comparison with FIG. 12, with the fitted rectangle domain, more vertices of the grid (i.e., 11 versus 9) are located inside the polygon of the projected feasible region. (74)-(80) may be represented as follows:

$$\min \delta_1 \cdot \delta_2 \tag{74}$$

$$\alpha_1 \cdot \alpha_2 = -1; \tag{75}$$

$$\alpha_1 \geq 0; \alpha_2 \leq 0; \delta_1 \geq 0; \delta_2 \geq 0; \tag{76}$$

$$F_{2,w}^V - \alpha_1 \cdot F_{1,w}^V - \beta_1 \geq 0; \; w \in \mathcal{W} \tag{77}$$

$$F_{2,w}^V - \alpha_1 \cdot F_{1,w}^V - (\beta_1 + \delta_1) \leq 0; \; w \in \mathcal{W} \tag{78}$$

$$F_{2,w}^V - \alpha_2 \cdot F_{1,w}^V - \beta_2 \geq 0; \; w \in \mathcal{W} \tag{79}$$

$$F_{2,w}^V - \alpha_2 \cdot (F_{1,w}^V - \delta_2) - \beta_2 \leq 0; \; w \in \mathcal{W} \tag{80}$$

In the case of N=3 (despite most practical distribution systems fitting to N=1 or N=2 cases), $\mathcal{P}$ constructed from the operation feasible region of the distribution system can be represented in a higher dimensional space, while requiring simplexes of higher order. For example, when N=3, $\mathcal{P}$ represents a three-dimensional space, described via 4-simplexes. For a high-dimensional space, heterogeneous structures may be used to divide it into non-overlapping simplexes. The piecewise linear formulation is usually applicable to various division structures, with one binary indicating the active/inactive status of a simplex, while the logarithmic formulation requires a special structure, such as the Union Jack structure for a 2-dimensional domain.

Examples of the foregoing models and methods of this aspect of the disclosure were simulated to gauge whether such models and methods may be feasibly implemented in current ISO energy markets. Simulations used the 1888-bus transmission system from the MATPOWER library to evaluate example models and methods in terms of solution quality (e.g., line flow errors), economic efficiency, and computational performance. Modifications to the 1888-bus systems included creating 24-hour load profiles, supplementing generator parameters, and reducing line capacities. Ten distribution systems were interconnected to the 1888-bus system, each distribution system being a modified 33-bus distribution system with two ports to the transmission system. They were identical except the interconnection buses. Each distribution system contained 8 DERs and 6 flexible loads. Prices of DERs were set to be lower than those of thermal units in the transmission system. In each distribution system, 32 internal lines and 2 ports formed a looped topology and all lines were monitored via constraints (41)-(42). Line flow capacities were set as 5 MW, which were originally sufficient to supply all loads. However, with a high penetration of DERs, congestions could happen.

The ISO day-ahead energy market solves a 24-hour UC model, which is formulated as a mixed-integer linear programming (MILP) problem with the objective of minimizing the total system operating cost. The UC model contains typical constraints, such as generation dispatch ranges, minimum ON/OFF time, and ramping constraints at the unit level, as well as power balance and line flow constraints at the system level. Three models with different methods to simulate distribution systems are studied:

COM Model: The full UC model by exhaustively formulating distribution systems and their internal assets. This model is regarded as the benchmark, in which line flows of the transmission system and distribution systems are calculated through the SF matrix of the full network, while DERs and flexible loads in distribution systems are modeled similarly as those in the transmission system.

PWL Model: An embodiment of the proposed multi-port model for power exchanges and associated bidding strategies in the piece-wise linear formulation, as discussed in this aspect of the disclosure.

LOG Model: An embodiment of the proposed multi-port model for power exchanges and associated bidding strategies in the logarithmic formulation.

In all models, the UC formulation remains a MILP problem. All models were implemented via Yalmip in MAT-LAB and solved by Gurobi 9.0.0 to zero MIP gap (i.e., global optimal solutions were pursued for fair comparison). All simulations were executed on a PC with an i7-3.6 GHz CPU and 16 GB RAM.

Figure 15:
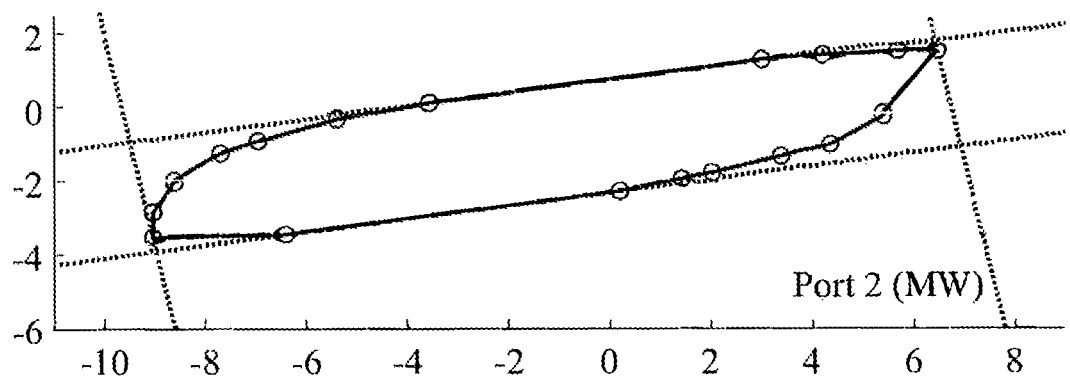
FIG. 15 shows an example of $\mathcal{P}$ and its fitted square domain according to an embodiment of the second aspect of the present disclosure.

Although all distribution systems shared an identical network configuration, their different interconnection locations led to different DD sub-blocks in the SF matrix and thus distinct $\mathcal{P}$ regions. An example of the feasible region is shown in FIG. 15. It has a coniferous shape enclosed by 18 lines. That is, $\mathcal{H}$ in (40) contained 18 inequality constraints. The 18 circles marked in FIG. 15 are intersections of the 18 lines. The dashed rectangle that well fits $\mathcal{P}$ is obtained from problem (74)-(80). It clearly shows that the rectangle covers the entire $\mathcal{P}$ and only contains very limited invalid areas.

A triangulation grid in Union Jack structure is then filled into the rectangle. The number of segments, $2^M$, is of importance to define the fineness of the grid. A larger M could improve accuracy of the cost function approximation, at the cost of higher computational burden. Different values of M from 3 to 5, corresponding to 8, 16, and 32 segments, were tested in PWL Model and LOG Model to evaluate the impacts of M on computational performance and economic efficiency.

Table I compares computational performance of the three models. It shows that with different settings on M, objectives of PWL Model and LOG Model are always identical, verifying that the two formulations are equivalent. However, as M increases, LOG Model significantly outperforms PWL Model in terms of computational efficiency. In addition, in both models, a larger M requires higher computational efforts, while it derives solutions of higher quality in terms of smaller objective deviation compared to the COM Model.

Moreover, compared with COM Model, LOG Model shows computational advantages with M of 3 and 4, but is more computational demanding when M=5. It can be concluded that the computational benefits by avoiding exhaustively modeling networks and individual assets of distribution systems may disappear when overly detailing the N=2 bidding model. Thus, a tradeoff on the value of M is inevitable. As illustrated, M=4 is appropriate in this system with higher computational performance and good accuracy in representing economic features. Thus, in the following studies, we focus on LOG Model with M=4 and compare it with the setting of M=3.

TABLE I

| Model | | Computational time (s) | Objective ($) | Objective deviation against COM Model ($) |
|---|---|---|---|---|
| PWL Model | 8 (M = 3) | 42.67 | 32,522,273.38 | +1,219.97 |
| | 16 (M = 4) | 63.36 | 32,521,373.53 | +320.12 |
| | 32 (M = 5) | 95.34 | 32,520,757.45 | −295.96 |
| LOG Model | 8 (M = 3) | 35.04 | 32,522,273.38 | +1,219.97 |
| | 16 (M = 4) | 36.84 | 32,521,373.53 | +320.12 |
| | 32 (M = 5) | 56.78 | 32,520,757.45 | −295.96 |
| COM model | | 48.03 | 32,521,053.41 | — |

Two metrics are used to evaluate closeness of distribution system solutions from LOG Model to COM Model. One is average power deviation on ports of a distribution system (WD) defined as in (81), and the other is average operating cost deviation of a distribution system (CD) defined as in (82). Operator $|\cdot|$ returns the absolute value; T=24 is the number of time intervals. In (81), $\hat{p}_{n,t}^{LOG}$ and $\hat{p}_{n,t}^{COM}$ denote the awarded power through port n at time t from LOG Model and COM Model, respectively. $\hat{p}_{n,t}^{COM}$ can be calculated via dispatches to all assets and SF matrix of the full network. In (82), $\hat{c}_t^{LOG}$ and $\hat{c}_t^{COM}$ indicate operating cost of a distribution system at time t from LOG Model and COM Model. $\hat{c}_t^{LOG}$ is calculated through (59), and $\hat{c}_t^{COM}$ equals to $\Sigma_{g \in \mathcal{G}} C_g \cdot \hat{p}_g - \Sigma_{d \in \mathcal{D}} C_d \hat{p}_d$. (81)-(82) may be represented as follows:

$$WD_n = \Sigma_{t=1}^T |\hat{p}_{n,t}^{LOG} - \hat{p}_{n,t}^{COM}|/T; \quad (81)$$

$$CD = \Sigma_{t=1}^T |\hat{c}_t^{LOG} - \hat{c}_t^{COM}|/T \quad (82)$$

A smaller value of WD/CD indicates that dispatches/operating costs from the two models are closer, verifying better economic efficiency of the multi-port model of this aspect of the present disclosure, indicating a better ability in capturing economic features of distribution systems.

Figure 16:
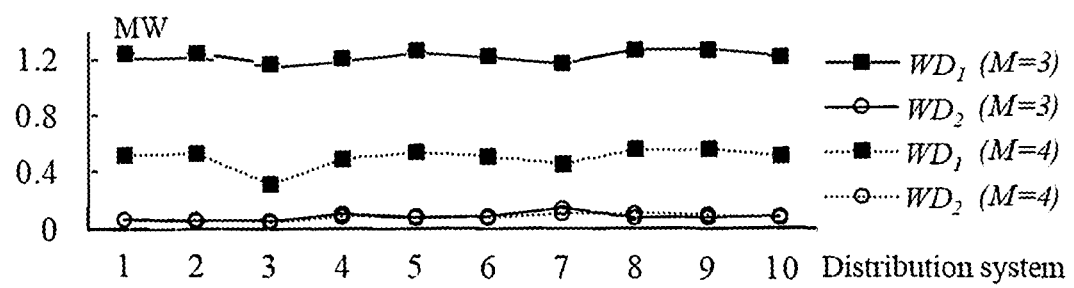
FIG. 16 shows a comparison of WD values for the ten distribution systems according to an embodiment of the second aspect of the present disclosure.

WD values of the 10 interconnected distribution systems under settings of M=3 and M=4 are shown in FIG. 16. As expected, the case of M=4 shows better economic efficiency than the case of M=3 on both ports for all distribution systems, which also explains a reduction of $899.85 in the objective deviation as shown in Table I. The small power deviation values under settings of M=4 verify effectiveness of the N=2 bidding model in capturing economic efficiency of distribution networks. Taken distribution network #1 at time t=1 as an example, its average total power injection through two ports over 24 hours, i.e. $\Sigma_{t=1}^T \Sigma_{n=1}^2 |\hat{p}_{n,t}^{COM}|/T$, is −10.77 MW, while summation of $WD_1$ and $WD_2$ is only 0.59 MW (5.48%). Moreover, average power deviations shown in FIG. 16 seem gathered on one port instead of fairly distributed on both ports. This is caused by unbalanced power dispatches on the two ports because of electrical coupling between $p_n$. For instance, average power injections into distribution network #1 through the two ports are −7.61 MW and −3.16 MW.

Values of CD for all distribution networks under settings of M=3 and M=4 are within [$50.76, $55.11] and [$13.77, $20.55], which further verify that the case of M=4 leads to better economic performance. It is worthwhile to emphasize that the operating cost deviation is positively related to the power deviation on awarded $p_n$.

Approximations adopted in the proposed approach would induce line flow errors. After the ISO energy market is cleared using LOG Model, power flows and generation dispatches of the transmission system, as well as awarded power on ports of the distribution systems become known. With awarded power-on ports, the DSOs can self-dispatch DERs and flexible loads by optimizing the problem (46)-(48). Accordingly, power flows on distribution lines and dispatches of assets (DERs and flexible loads) inside the distribution systems can be obtained. To this end, power flows of all transmission and distribution lines are obtained, which, however, are approximated values with potential errors, because the ISO energy market clearing model adopts the approximated network model.

Figure 17:
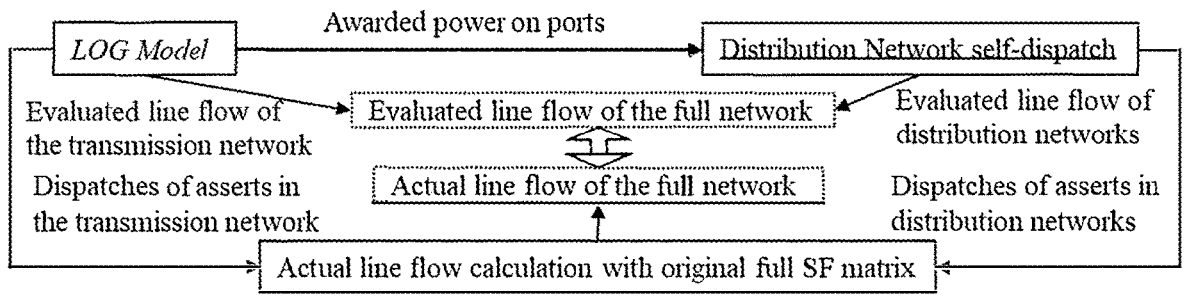
FIG. 17 shows a flowchart of the line flow comparison process according to an embodiment of the second aspect of the present disclosure.

Indeed, with dispatches of all transmission assets derived from LOG Model and dispatches of all distribution assets from the self-dispatch problem, actual line flows can be exactly calculated using the original SF matrix of the full network. The absolute differences between the approximated and the actual line flow values may be defined as line flow errors. The flowchart of the line flow comparison process is shown in FIG. 17.

Figure 18:
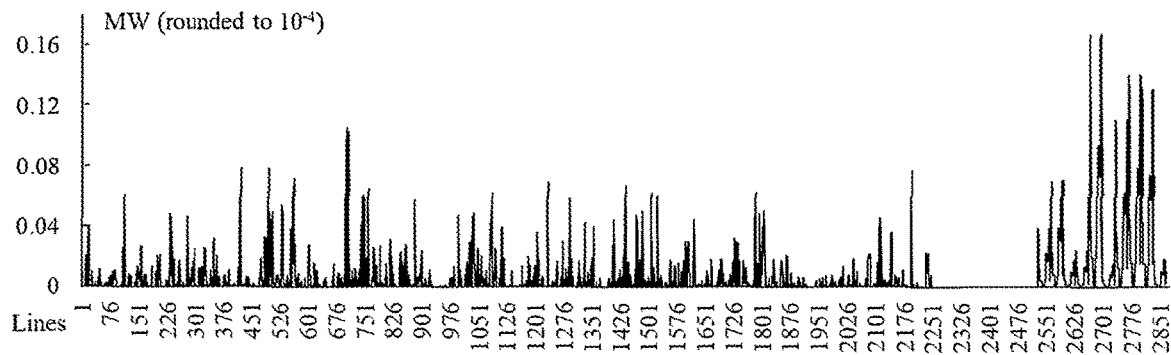
FIG. 18 shows maximum line flow errors over 24 hours for each line in the full grid according to an embodiment of the second aspect of the present disclosure.

FIG. 18 shows the maximum line flow errors over 24 hours of individual transmission/distribution lines from Log Model with M=4. Assets #1-#2531 are lines/transformers of the transmission network, and #2532-#2571 are lines/ports of the ten distribution systems. FIG. 18 shows that line flow errors in the transmission system, which are less than 0.11 MW, are negligible and mainly exist on lines electrically closer to distribution systems. In comparison, line flow errors in distribution systems are noticeable. This is because line flow errors induced by ignoring the TD sub-block are relatively larger than that induced by equating distribution networks as variable loads to the transmission system via the TT sub-block. Levels of line flow errors among different distribution systems also vary, mainly because of their different interconnection locations in the transmission system. For instance, line flow errors of distribution system #5 (i.e., lines #2668-#2699) are larger than others. In this case, the largest line flow error of 0.1663 MW occurs on line #2698 at t=15. In fact, compared with other distribution systems, shift factors of distribution system #5 in the TD sub-block, which is approximated as zeros and plays a major role in inducing errors, is not notable large. However, at bus #1799, the corresponding shift factor of line #2673 in the TD sub-block is much higher than other distribution lines, and a 605 MW generator is connected at this bus. These all together cause a line flow error of 0.0563 MW, over 33% of the total flow error of this line. This explains the two main factors causing distribution line flow errors.

The approximations adopted in the proposed approach could cause under or overestimations of distribution line flows. Specifically, evaluated power flows through approximations could underestimate actual flows with respect to dispatches of all transmission and distribution assets, which might have already violated their limits at certain time intervals. For example, evaluated power flow on line #2688 in distribution system #5 at t=15 is binding at its capacity limit of 5.00 MW, while the actual power flow is 5.02 MW. An example of underestimation also occurs at line #2756 in distribution network #7. The evaluated and actual power flows are respectively 5.00 MW and 4.98 MW at t=15. However, considering these values are rather small, a secure margin could be applied to avoid violations in practice, while operational economics shall not be significantly compromised under underestimation situations.

Figure 19:
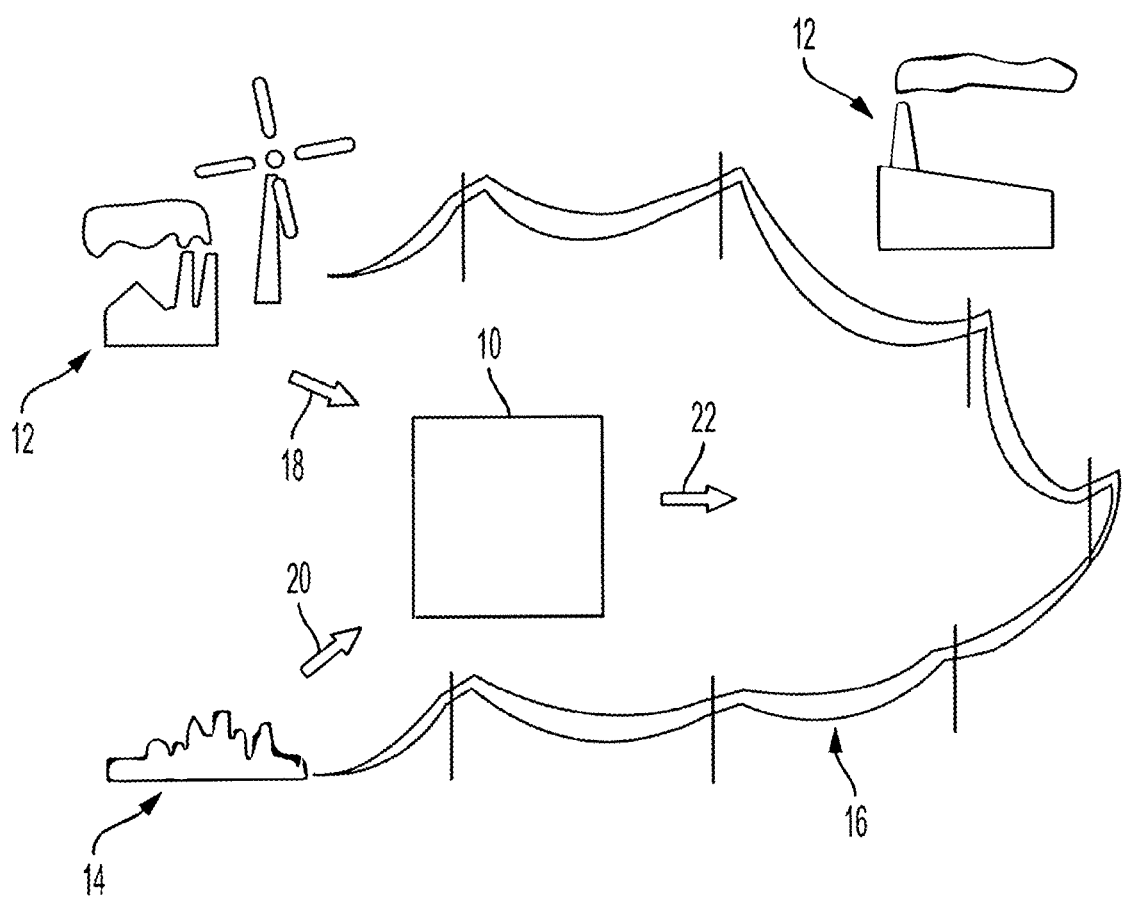
FIG. 19 shows an example block-diagram representation of a power grid according to one or more aspects of the present disclosure.

FIG. 19 shows an example block-diagram representation of a power grid according to one or more aspects of the present disclosure. Referring to FIG. 19, an example ISO or controller 10, according to the current disclosure, may administer the market for electricity producers 12 and users 14 on an electric power grid 16. Some example functions of the controller 10 may include monitoring energy transfers on the transmission system, scheduling transmission service, managing power congestion, operating day-ahead and real-time energy markets and operating reserves markets, and regional transmission planning. Both the electricity producers 12 and the users 14 may be considered to be market participants, as they may conduct business within the controller's 10 region. Traditionally, the electricity producers may provide offers 18 of electrical power and the users may provide bids 20 for power. The controller 10 may process the offers 18 and the bids 20 with consideration of the transfer limits on grid 16 to determine commitments of electrical power and then controlling the dispatch 22 of electricity flowing through the grid 16 based at least in part on the commitments.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following potential points of novelty.

What is claimed is:

1. A method of operating an electrical power grid, comprising:
   collecting bids describing one or more electricity characteristics, by an operator, in an energy market from one or more electricity transmitters and one or more distributors, wherein at least one of the distributors includes interconnected distributed energy resources, the distributed energy resources intermittently providing electricity to their interconnected distributor; and
   clearing in an operator day-ahead energy market model, by the operator, the energy market with consideration of a transfer limit on the electrical power grid to determine commitments of electrical power;
   providing one or more electricity characteristics to the one or more distributors and to the distributed energy resources; and
   causing a controlling of dispatch of the electrical power through the electrical power grid based on the commitments to capture impacts of the interconnected distributed energy resources while respecting the transfer limit on the electrical power grid;
   wherein, in the collecting step, the one or more distributors prepares a projected feasible operation region of a corresponding distribution system and submits it to the operator, together with bids of distributed energy resources, the projected feasible operation region including one or more desired variables; and
   wherein, in the clearing step, solutions to the one or more desired variables are sent to the one or more distributors.

2. The method of claim 1, wherein the projected feasible operation region is based on a feasible operation region represented by the following:

$$p_{ii',t}=G_{ii'}(v_{i,t}-v_{i',t})-B_{ii'}(\theta_{i,t}-\theta_{i',t}); \; ii' \in \mathcal{L}_d^D, t \in \mathcal{T} \quad (12)$$

$$q_{ii',t}=-B_{ii'}(v_{i,t}-v_{i',t})-G_{ii'}(\theta_{i,t}-\theta_{i',t}); \; ii' \in \mathcal{L}_d^D, t \in \mathcal{T} \quad (13)$$

$$\Sigma_{ii' \in \mathcal{L}_d^D} p_{ii',t} + \Sigma_{f \in \mathcal{F}_{i,t}^D} P_{f,t} = \Sigma_{i'i \in \mathcal{L}_d^D} p_{i'i,t} + \Sigma_{g \in \mathcal{G}_{i,t}^D} p_{g,t}; \; i \in \mathcal{J}_d^D / \mathcal{J}_d^B, t \in \mathcal{T} \quad (14)$$

$$\Sigma_{ii' \in \mathcal{L}_d^D} q_{ii',t} + \Sigma_{f \in \mathcal{F}_{i,t}^D} Q_{f,t} = \Sigma_{i'i \in \mathcal{L}_d^D} q_{i'i,t} + \Sigma_{g \in \mathcal{G}_{i,t}^D} q_{g,t}; \; i \in \mathcal{J}_d^D / \mathcal{J}_d^B, t \in \mathcal{T} \quad (15)$$

$$\Sigma_{ii' \in \mathcal{L}_d^D} p_{ii',t} = P_{i,t}; \; i \in \mathcal{J}_d^B, t \in \mathcal{T} \quad (16)$$

$$\sum_{ii' \in \mathcal{L}_d^D} q_{ii',t} = q_{i,t}; \ i \in \mathcal{J}_d^B, t \in \mathcal{T} \quad (17)$$

$$v_{i,t} = 1; \ i \in \mathcal{J}_d^B, t \in \mathcal{T} \quad (18)$$

$$-P_{ii'}^{UB} \leq p_{ii',t} \leq P_{ii'}^{UB}; \ ii' \in \mathcal{L}_d^D, t \in \mathcal{T} \quad (19)$$

$$V_i^{LB} \leq v_{i,t} \leq V_i^{UB}; \ i \in \mathcal{J}_d^D / \mathcal{J}, t \in \mathcal{T} \quad (20)$$

$$-P_i^{UB} \leq p_{i,t} \leq P_i^{UB}; \ i \in \mathcal{J}_d^B, t \in \mathcal{T} \quad (21)$$

$$-Q_i^{UB} \leq q_{i,t} \leq Q_i^{UB}; \ i \in \mathcal{J}_d^B, t \in \mathcal{T} \quad (22)$$

$$P_g^{LB} \leq p_{g,t} \leq P_g^{UB}; \ g \in \mathcal{G}_d^D, t \in \mathcal{T} \quad (23)$$

$$Q_g^{LB} \leq q_{g,t} \leq Q_g^{UB}; \ g \in \mathcal{G}_d^D, t \in \mathcal{T} \quad (24)$$

wherein $p_{ii',t}$ represents active power flow along line ii' at time t; $q_{ii',t}$ represents reactive power flow along line ii' at time t; $G_{ii'}$ and $B_{ii'}$ represent conductance and susceptance of line ii'; $v_{i,t}$ represents voltage magnitude of bus i at time t; $\theta_{i,t}$ represents a voltage phase angle of bus i at time t; $p_{g,t}$ represents active power dispatch of unit g at time t; $q_{g,t}$ represents reactive power dispatch of unit g at time t; notations $\mathcal{J}$, $\mathcal{L}$, $\mathcal{G}$, and $\mathcal{F}$ denote sets of buses, lines, DERs, flexible loads, and fixed loads in a distribution system; $\mathcal{T}$ denotes a set of time intervals in a scheduling horizon, indexed by time t; $Q_{f,t}$ represents reactive power demand of fixed load f at time t; $P_{ii'}^{UB}$ represents an active power limit of line ii'; $V_i^{LB}/V_i^{UB}$ represents a lower/upper voltage limit of bus i; and $P_g^{LB}/P_g^{UB}$ and $Q_g^{LB}/Q_g^{UB}$ represent active and reactive power bounds limiting dispatch ranges of DERs.

3. The method of claim 1, wherein the projected feasible operation region is realized through a process of eliminating one or more variables by applying a Gaussian elimination and a Fourier-Motzkin elimination sequentially.

4. The method of claim 3, wherein applying the Fourier-Motzkin elimination includes executing one or more filtering techniques to eliminate redundant constraints.

5. The method of claim 2, wherein the projected feasible operation region is realized through a process of eliminating one or more variables by applying a Gaussian elimination and a Fourier-Motzkin elimination sequentially.

6. The method of claim 5, wherein applying the Fourier-Motzkin elimination includes executing one or more filtering techniques to eliminate redundant constraints.

7. The method of claim 4, wherein the projected feasible operation region is represented by the following:

$$\sum_{i \in \mathcal{J}_d^B} A_{h,i,t}^\theta \cdot \theta_{i,t} + \sum_{i \in \mathcal{J}_d^B} A_{h,i,t}^P \cdot p_{i,t} + \sum_{g \in \mathcal{G}_d^D} A_{h,g,t}^G \cdot p_{g,t} \leq B_{h,t}; \ h \in \mathcal{H}_{d,t} \in \mathcal{T} \quad (27)$$

wherein $\theta_{i,t}$ represents a voltage phase angle of bus i at time t; $A_{h,i,t}^\theta$, $A_{h,i,t}^P$, and $A_{h,g,t}^G$ are generated coefficients to desired variables $\theta_{i,t}$ ($i \in \mathcal{J}_d^B$), $P_{i,t}$, and $P_{g,t}$; $B_{h,t}$ is a generated constant term; $\mathcal{H}_{d,t}$ indexed by h, represents all generated constraints at time t of distribution system d; and $\mathcal{T}$ denotes a set of time intervals in a scheduling horizon, indexed by time t.

8. The method of claim 6, wherein the projected feasible operation region is represented by the following $$\sum_{i \in \mathcal{J}_d^B} A_{h,i,t}^\theta \cdot \theta_{i,t} + \sum_{i \in \mathcal{J}_d^B} A_{h,i,t}^P \cdot p_{i,t} + \sum_{g \in \mathcal{G}_d^D} A_{h,g,t}^G \cdot p_{g,t} \leq B_{h,t}; \ h \in \mathcal{H}_{d,t} \in \mathcal{T} \quad (27)$$

wherein $\theta_{i,t}$ represents a voltage phase angle of bus i at time t; where $A_{h,i,t}^\theta$, $A_{h,i,t}^P$, and $A_{h,g,t}^G$ are generated coefficients to desired variables $\theta_{i,t}$ ($i \in \mathcal{J}_d^B$), $P_{i,t}$, and $P_{g,t}$; $B_{h,t}$ is a generated constant term; $\mathcal{H}_{d,t}$ indexed by h, represents all generated constraints at time t of distribution system d; and $\mathcal{T}$ denotes a set of time intervals in a scheduling horizon, indexed by time t.

9. The method of claim 7, wherein one or more distribution-side variables is set to equal one or more transmission-side counterparts as follows:

$$\hat{p}_{i',d,t} = p_{i,t}; \ i' \in \mathcal{J}_{i,d}^T, i \in \mathcal{J}_d^B, t \in \mathcal{J} \quad (28)$$

$$\hat{\theta}_{i',t} = \theta_{i,t}; \ i' \in \mathcal{J}_{i,d}^T, i \in \mathcal{J}_d^B, t \in \mathcal{J} \quad (29)$$

wherein $\hat{p}_{i',d,t}$ and $\hat{\theta}_{i',t}$ represent transmission system counterparts of $p_{i,t}$ and $\theta_{i,t}$; $\mathcal{J}_d^B$ represents a set of duplicated interconnection buses in distribution system d; $\mathcal{J}_{i,d}^T$ represents a transmission system counterpart of $\mathcal{J}_d^B$; and $\mathcal{T}$ denotes a set of time intervals in a scheduling horizon, indexed by time t.

10. The method of claim 4, wherein the operator includes the projected feasible operation region in the day-ahead energy market model.

11. The method of claim 6, wherein the operator includes the projected feasible operation region in the day-ahead energy market model.

12. A method of operating an electrical power grid, comprising:
collecting bids describing one or more electricity characteristics, by an operator, in an energy market from an electricity transmitter and one or more distributors, wherein the one or more distributors include interconnected distributed energy resources, each distributed energy resource intermittently providing electricity to its interconnected distributor;
calculating, by the operator, a distribution-to-distribution sub-matrix of an energy market clearing model for each distributor and releasing the calculated distribution-to-distribution sub-matrix to each distributor;
preparing, by each distributor, a multi-port power-exchange model from the calculated distribution-to-distribution sub-matrix and submitting the prepared multi-port power-exchange model to the operator; and
clearing, in the energy market clearing model, by the operator, the energy market with consideration of a transfer limit on the electrical power grid to determine commitments of electrical power;
providing one or more electricity characteristics to the one or more distributors and to the distributed energy resources; and
causing a controlling of dispatch of the electrical power through the electrical power grid based on the commitments to capture impacts of the interconnected distributed energy resources while respecting the transfer limit on the electrical power grid;
wherein the energy market clearing model additionally includes one or more elements of a distribution-to-transmission sub-matrix to account for impacts of the distributors on one or more transmission line constraints.

13. The method of claim 12, wherein the multi-port power-exchange model accounts for one or more physical operation features of a corresponding distributor.

14. The method of claim 13, wherein the multi-port power-exchange model is represented by the following:

$$\sum_{n \in \mathcal{N}} A_{h,n} \cdot p_n \leq B_h; \ h \in \mathcal{H} \quad (40)$$

wherein $\mathcal{N}$ represents a set of ports indexed by n; $A_{h,n}$ represents a generated coefficient to $p_n$; $p_n$ denotes power flow injected into a distribution system through port n; $B_h$ represents a generated constant term; and $\mathcal{H}$ represents a set of generated constraints indexed by h.

15. The method of claim 12, wherein the preparing step includes formulating an operation feasible region.

16. The method of claim 15, wherein the operation feasible region is represented by the following:

$$-F_l^{UB} \leq \Sigma_{i \in J} SF_{l,i} \cdot (\Sigma_{g \in \mathcal{G}_i} p_g - \Sigma_{d \in \mathcal{D}_i} p_d - \Sigma_{f \in \mathcal{F}_i} P_f) \leq F_l^{UB}; l \in \mathcal{L} \quad (41)$$

$$p_n = \Sigma_{i \in J} SF_{n,i} \cdot (\Sigma_{g \in \mathcal{G}_i} p_g - \Sigma_{d \in \mathcal{D}_i} p_d - \Sigma_{f \in \mathcal{F}_i} P_f); n \in \mathcal{N} \quad (42)$$

$$-F_n^{UB} \leq p_n \leq F_n^{UB}; n \in \mathcal{N} \quad (43)$$

$$P_g^{LB} \leq p_g \leq P_g^{UB}; g \in \mathcal{G} \quad (44)$$

$$P_d^{LB} \leq p_d \leq P_d^{UB}; d \in \mathcal{D} \quad (45)$$

wherein $F_l^{UB}$ and $F_n^{UB}$ represent capacity limits of distribution line l and port n; $SF_{l,i}$ and $SF_{n,i}$ represents shift factors of bus i to line l and port n, respectively; $P_f$ represents demand level of fixed load f; $[P_g^{LB}, P_g^{UB}]$ and $[P_d^{LB}, P_d^{UB}]$ represent dispatch ranges of DER g and flexible load d; and $\mathcal{N}$ represents a set of ports is indexed by n.

17. The method of claim 16, wherein the multi-port power-exchange model is constructed from (41)-(45) by applying Gaussian elimination and Fourier-Motzkin elimination.

18. The method of claim 17, wherein the application of Fourier-Motzkin elimination includes a step of removing redundant constraints through the sequential application of Imbert's acceleration theorems, boundary filtering, and linear programming filtering.

19. The method of claim 16, further comprising optimizing a total operating cost of each distribution system by solving the following or an approximation thereof:

$$\min C(\hat{p}_n) = \Sigma_{g \in \mathcal{G}} C_g \cdot p_g - \Sigma_{d \in \mathcal{D}} C_d \cdot p_d \quad (46)$$

Constraints (41) and (44)-(45); (47)

$$\hat{p}_n = \Sigma_{i \in J} SF_{n,i} \cdot (\Sigma_{g \in \mathcal{G}_i} p_g - \Sigma_{d \in \mathcal{D}_i} p_d - \Sigma_{f \in \mathcal{F}_i} P_f); n \in \mathcal{N} \quad (48)$$

wherein $p_n$ represents power flow injected into a distribution system through port n; $\hat{\cdot}$ indicates a known solution of a variable; $C(\hat{p}_n)$ represents an operating cost as a function of $p_n$ over a feasible region; $C_g$ and $C_d$ represents price of DER g and flexible load d; $p_g$ and $p_d$ denote dispatches of DER g and flexible load d; $P_f$ represents demand level of fixed load f; $SF_{n,i}$ is shift factor of bus i to port n; $\mathcal{G}_i$, $\mathcal{G}_i$, and $\mathcal{F}_i$ denote sub-sets of DERs, flexible loads, and fixed loads at bus i, indexed by g, d, and f, and $\mathcal{N}$ represents a set of ports is indexed by n.

* * * * *